US012663678B2

(12) United States Patent
Noma et al.

(10) Patent No.: US 12,663,678 B2
(45) Date of Patent: Jun. 23, 2026

(54) DISPLAY DEVICE

(71) Applicant: Sharp Display Technology Corporation, Kameyama City (JP)

(72) Inventors: Mikihiro Noma, Kameyama City (JP); Masayuki Hata, Kameyama City (JP); Takatoshi Kira, Kameyama City (JP)

(73) Assignee: Sharp Display Technology Corporation, Kameyama City (JP)

( * ) Notice: Subject to any disclaimer, the term of this patent is extended or adjusted under 35 U.S.C. 154(b) by 0 days.

(21) Appl. No.: 18/911,845

(22) Filed: Oct. 10, 2024

(65) Prior Publication Data

US 2025/0138372 A1 May 1, 2025

(30) Foreign Application Priority Data

Oct. 31, 2023 (JP) ................................. 2023-186282

(51) Int. Cl.
*G02F 1/1339* (2006.01)
*G02F 1/1333* (2006.01)
*G02F 1/1343* (2006.01)

(52) U.S. Cl.
CPC ...... *G02F 1/1339* (2013.01); *G02F 1/133368* (2021.01); *G02F 1/13439* (2013.01)

(58) Field of Classification Search
CPC ............. G02F 1/1339; G02F 1/133368; G02F 1/13439
See application file for complete search history.

(56) References Cited

U.S. PATENT DOCUMENTS

| | | | |
|---|---|---|---|
| 2007/0009674 A1* | 1/2007 | Okubo ................. | G02F 1/1333 428/1.4 |
| 2008/0278458 A1* | 11/2008 | Masuzawa ............ | G06F 3/0445 345/174 |
| 2010/0028564 A1* | 2/2010 | Cheng ................. | G02B 5/3025 428/697 |
| 2010/0182524 A1 | 7/2010 | Nomura | |
| 2012/0128995 A1 | 5/2012 | Leto et al. | |
| 2012/0237783 A1 | 9/2012 | Leto | |
| 2012/0274603 A1* | 11/2012 | Kim ...................... | G06F 3/0412 345/174 |
| 2012/0308806 A1 | 12/2012 | Leto et al. | |
| 2015/0261320 A1 | 9/2015 | Leto | |
| 2016/0015100 A1 | 1/2016 | Leto | |

(Continued)

FOREIGN PATENT DOCUMENTS

| | | |
|---|---|---|
| JP | 2010-164800 A | 7/2010 |
| JP | 2012-529127 A | 11/2012 |

(Continued)

*Primary Examiner* — Lucy P Chien
(74) *Attorney, Agent, or Firm* — ScienBiziP, P.C.

(57) ABSTRACT

A display device includes a first substrate having a first surface defined as a display surface and a second surface that is an opposite surface of the first surface, a second substrate disposed opposite the second surface of the first substrate, and a conductive film disposed on the second surface of the first substrate. The display surface is divided into a display area displaying an image and a non-display area displaying no image. The conductive film is disposed to overlap at least the display area and includes synthetic resin material having light transmissive properties.

2 Claims, 15 Drawing Sheets

(56) References Cited

U.S. PATENT DOCUMENTS

| | | | | |
|---|---|---|---|---|
| 2016/0196892 A1* | 7/2016 | Ohori | ...................... | G06F 3/041 |
| | | | | 345/173 |
| 2017/0373270 A1* | 12/2017 | Kim | ................... | H10K 59/1213 |
| 2019/0064569 A1 | 2/2019 | Kugimiya et al. | | |
| 2019/0155115 A1 | 5/2019 | Sakamoto et al. | | |
| 2020/0192176 A1* | 6/2020 | Bull | ......................... | C09D 5/24 |

FOREIGN PATENT DOCUMENTS

| | | | |
|---|---|---|---|
| JP | 2017-179599 A | 10/2017 |
| WO | 2018/008725 A1 | 1/2018 |

* cited by examiner

|  | REFERENCE EXAMPLE | EXAMPLE 1 | EXAMPLE 2 | EXAMPLE 3 | COMPARATIVE EXAMPLE 1 | COMPARATIVE EXAMPLE 2 |
|---|---|---|---|---|---|---|
| REFRACTIVE INDEX | (1. 52) | 1. 6 | 1. 7 | 1. 8 | 1. 98 | 2. 08 |
| LIGHT REFLECTANCE (%) | 0. 65 | 0. 67 | 0. 73 | 0. 89 | 1. 2 | 1. 57 |
| DIFFERENCE VALUE (%) | 0 | 0. 02 | 0. 08 | 0. 24 | 0. 55 | 0. 92 |

235

235D

1
DISPLAY DEVICE

CROSS REFERENCE TO RELATED APPLICATION

This application claims priority from Japanese Patent Application No. 2023-186282 filed on Oct. 31, 2023. The entire contents of the priority application are incorporated herein by reference.

TECHNICAL FIELD

The present technology described herein relates to a display device.

BACKGROUND

One example of display input devices (display devices) includes a light transmissive substrate and an antistatic film that is formed on the light transmissive substrate with the magnetron sputtering method. The antistatic film has light transmissive properties and includes In, Zn, Sn, and O. In the antistatic film, In content is 21.2 atomic %, Zn content is 5 to 55 atomic %, and Sn content is 8 to 40 atomic %.

Such a display input device includes a first transparent substrate including TFTs and a second transparent substrate including touch sensors. The antistatic film is disposed on an outer surface of the second transparent substrate. The antistatic film is made of indium zinc tin oxide (IZTO) and has a refractive index higher than that of the second transparent substrate that is made of glass material. Therefore, external light is likely to reflect off an interface between the antistatic film and the second transparent substrate. Due to the reflected light, the contrast properties of display image are likely to be lowered.

SUMMARY

The technology described herein was made in view of the above circumstances. An object is to improve display quality.

(1) A display device according to the technology described herein includes a first substrate having a first surface defined as a display surface and a second surface that is an opposite surface of the first surface, a second substrate disposed opposite the second surface of the first substrate, and a conductive film disposed on the second surface of the first substrate. The display surface is divided into a display area displaying an image and a non-display area displaying no image. The conductive film is disposed to overlap at least the display area and includes synthetic resin material having light transmissive properties.

(2) In the display device, in addition to (1), sheet resistance of the conductive film may be from $1\times10^7$ $\Omega$/sq to $1\times10^9$ $\Omega$/sq.

(3) The display device may further include, in addition to (2), position detection electrodes that are disposed on the second substrate and create a capacitance with a position input body that is for performing position input, and position detection lines that are disposed on the second substrate and connected to the position detection electrodes and transmit position detection signals.

(4) In the display device, in addition to any one of (1) to (3), the first substrate may be made of glass material, and refractive index of the conductive film may be from 1.5 to 1.8.
(5) The display device may further include, in addition to any one of (1) to (4), a sealing portion having a frame shape and disposed between outer peripheral edge portions of the first substrate and the second substrate, an electrode disposed on the second substrate and on an inner side of the sealing portion, the electrode being at a ground potential, and a connection portion disposed between the first substrate and the second substrate and on the inner side of the sealing portion and connected to the conductive film and the electrode. The conductive film may be disposed on the inner side of the sealing portion.

(6) In the display device, in addition to any one of (1) to (5), the conductive film may include insulating resin material as the synthetic resin material and electrically conductive agent contained in the insulating resin material.

(7) In the display device, in addition to (6), the conductive film may include carbon nanotubes as the electrically conductive agent.

(8) In the display device, in addition to (6), the conductive film may include transparent electrode material containing indium (In) as the electrically conductive agent.

(9) In the display device, in addition to any one of (1) to (5), the conductive film may include conductive polymer material as the synthetic resin material.

(10) A display device according to the technology described herein includes a first substrate made of glass substrate and having a first surface defined as a display surface and a second surface that is an opposite surface of the first surface, a second substrate disposed opposite the second surface of the first substrate, and a conductive film disposed on one of the first surface and the second surface of the first substrate. The display surface is divided into a display area displaying an image and a non-display area displaying no image. The conductive film is disposed to overlap at least the display area and has light transmissive properties and has sheet resistance that is from $1\times10^7$ $\Omega$/sq to $1\times10^9$ $\Omega$/sq and refractive index that is from 1.5 to 1.8.

According to the technology described herein, display quality is improved.

BRIEF DESCRIPTION OF THE DRAWINGS

FIG. 4 is a cross-sectional view of the liquid crystal panel according to the first embodiment taken along iv-iv line in FIG. 1.

FIG. 5 is a cross-sectional view of the liquid crystal panel according to the first embodiment taken along v-v line in FIG. 1.

DETAILED DESCRIPTION

First Embodiment

Figure 1:
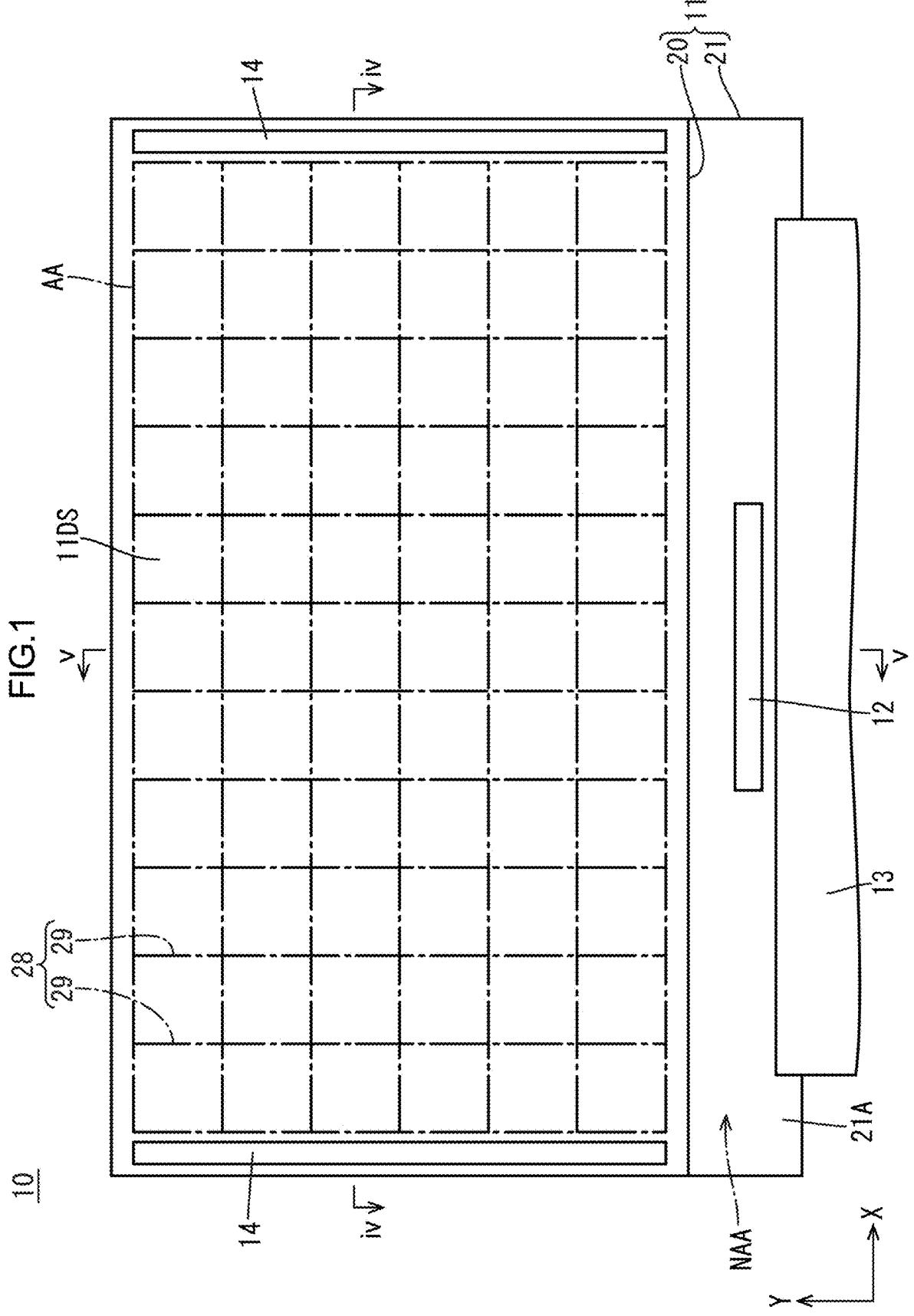
FIG. 1 is a plan view illustrating a liquid crystal panel, a driver, and a flexible substrate included in a liquid crystal display device according to a first embodiment.

A first embodiment will be described with reference to FIGS. 1 to 13. In this embodiment section, a liquid crystal display device 10 with a display function and a touch panel function (a position input function) will be described. X-axes, Y-axes, and Z-axes may be present in the drawings. The axes in each drawing correspond to the respective axes in other drawings. An upper side and a lower side in FIGS. 2, 4, and 5 correspond to a front side and a back side of the liquid crystal display device 10, respectively.

As illustrated in FIG. 1, the liquid crystal display device 10 at least includes a liquid crystal panel 11 (a display device, a display panel) that has a laterally long rectangular plan view shape and displays an image and a backlight unit (a lighting device) that is an external light source and supplies light to the liquid crystal panel 11 for displaying. The backlight unit is disposed behind (on a back surface side of) the liquid crystal panel 11. The backlight unit includes light sources configured to emit white light (e.g., LEDs) and optical members for converting the light from the light sources into planar light by applying optical effects to the light from the light sources. The liquid crystal panel 11 has a display surface 11DS facing a front side. A middle section of the display surface 11DS is configured as a display area AA in which images are displayed and an outer section in a frame shape surrounding the display area AA is configured as a non-display area NAA in which images are not displayed.

As illustrated in FIG. 1, circuits 14 (a gate circuit, a surrounding circuit) are disposed in the non-display area NAA of the liquid crystal panel 11. A pair of circuits 14 are disposed to sandwich the display area AA with respect to the X-axis direction. The circuit 14 is disposed in a belt shape area extending in the Y-axis direction. The circuits 14 are for supplying scan signals to gate lines 26, which will be described later, and are monolithically fabricated on an array substrate 21, which will be described later. The circuit 14 is a gate driver monolithic (GDM) circuit. The circuit 14 includes a shift resister circuit that is configured to output the scan signals at a predetermined timing and a buffer circuit that is configured to amplify the scan signal.

Figure 2:
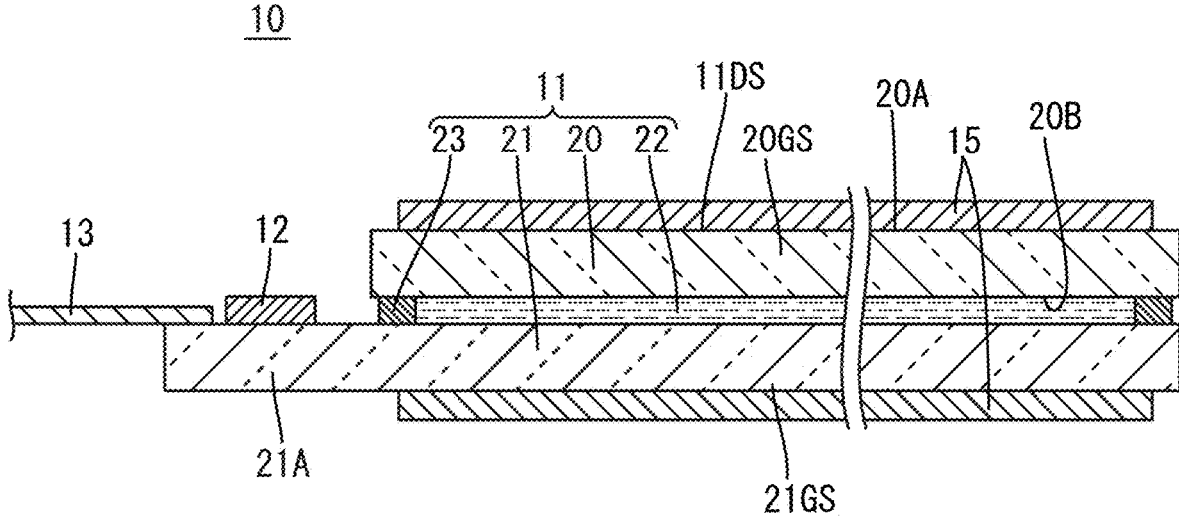
FIG. 2 is a cross-sectional view illustrating the liquid crystal panel, the driver, and the flexible substrate according to the first embodiment.
Figure 2:
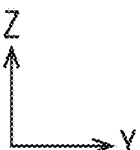

The liquid crystal panel 11 will be described in detail with reference to FIGS. 1 and 2. As illustrated in FIGS. 1 and 2, the liquid crystal panel 11 includes a pair of substrates 20, 21 that are bonded to each other. One of the substrates 20, 21 on the front side (a front surface side) is an opposed substrate 20 (a first substrate, a CF substrate) and another one on the back side (a back surface side) is an array substrate 21 (a second substrate). The opposed substrate 20 and the array substrate 21 include glass substrates 20GS, 21GS (a substrate) and various kinds of films are formed in layers on an inner surface side of the glass substrates 20GS, 21GS. For example, alkali-free glass may be used as glass material of the glass substrates 20GS, 21GS. A pair of front and back surfaces 20A, 20B of the opposed substrate 20 includes a first surface 20A (one of the surfaces) facing an outer side (a front side). The first surface 20A is configured as the display surface 11DS. The pair of front and back surfaces 20A, 20B of the opposed substrate 20 includes a second surface 20B (another one of the surfaces) facing an inner side (a back side). The second surface 20B is opposite an inner side surface of the array substrate 21. A liquid crystal layer 22 (a medium layer) is disposed between the second surface 20B, which is an inner side surface, of the opposed substrate 20 and the inner side surface of the array substrate 21. The liquid crystal layer 22 includes liquid crystal molecules having optical characteristics that vary according to application of electric field. A sealing portion 23 is disposed between the outer peripheral portions of the substrates 20, 21 for sealing the liquid crystal layer 22. The sealing portion 23 is made of photocuring resin or thermosetting resin and is formed in a frame shape (an endless loop shape) and surrounds the liquid crystal layer 22. The sealing portion 23 is disposed to overlap the outer peripheral portion of the non-display area NAA. Polarizing plates 15 are attached to outer surfaces of the substrates 20 and 21.

As illustrated in FIGS. 1 and 2, the opposed substrate 20 has a short-side dimension that is smaller than a short-side dimension of the array substrate 21. The opposed substrate 20 is bonded to the array substrate 21 such that one of the long sides of the opposed substrate 20 is aligned with a corresponding one of the long sides of the array substrate 21. Therefore, a long side edge section including another one of the long sides of the array substrate 21 projects from another one of the long sides of the opposed substrate 20 and a projecting long side edge section is an uncovered section 21A. An entire area of the uncovered section 21A is the non-display area NAA and a driver 12 (a signal supply section) that is a component for supplying various signals related to a display function and a touch panel function and a flexible substrate 13 are mounted on the uncovered section 21A.

The driver 12 illustrated in FIGS. 1 and 2 is an LSI chip including a driver circuit therein. The driver 12 is mounted on the uncovered section 21A of the array substrate 21 through the chip-on-glass (COG) technology. The driver 12 processes the various kinds of signals transmitted from the flexible substrate 13. The driver 12 is a component for supplying various kinds of signals (such as image signals and touch signals) to the lines (specifically, source lines 27 and touch lines 30, which will be described later) in the display area AA. The flexible substrate 13 includes a synthetic resin substrate made of synthetic resin material (e.g., polyimide-based substrate) having insulating properties and flexibility and multiple traces formed on the substrate. As illustrated in FIGS. 1 and 2, a first end of the flexible substrate 13 is connected to the uncovered section 21A of the array substrate 21 and a second end of the flexible substrate 13 is connected to an external circuit board (a control board). The flexible substrate 13 is connected to an end of the uncovered section 21A that is an opposite end from the display area AA with respect to the driver 12 in the Y-axis direction.

The liquid crystal panel 11 according to this embodiment has a display function for displaying images and a touch panel function for detecting positions of input performed by a user based on the displayed images (input positions). The liquid crystal panel 11 includes an integrated touch panel pattern (with an in-cell technology) for exerting the touch panel function. The touch panel pattern uses so-called a projection type electrostatic capacitance method. A self-capacitance method is used for detection. As illustrated in FIG. 1, the touch panel pattern includes touch electrodes 29 (a position detection electrode) that are arranged in a matrix within the plate surface of the liquid crystal panel 11. The touch electrodes 29 are disposed in the display area AA of the liquid crystal panel 11. The display area AA of the liquid crystal panel 11 substantially corresponds to a touch area in which input positions are detectable (a position input area). The non-display area NAA substantially corresponds to a non-touch area in which input positions are not detectable (a non-position input area). When the user intends to input a position based on a displayed image that is displayed in the display area AA of the liquid crystal panel 11 and the user moves a finger (a position input body) that is an electrically conductive member closer to the surface of the liquid crystal panel 11 (the display surface 11DS), the finger and the touch electrode 29 form a capacitor. A capacitance measured at the touch electrode 29 close to the finger changes as the finger approaches the touch electrode 29 and is different from a capacitance at the touch electrodes 29 farther from the finger. Based on the difference in capacitance, the input position can be detected. The specific number of touch electrodes 29 can be altered from the one illustrated in FIG. 1. The touch electrode 29 has a substantially square plan view shape and one side dimension is about several millimeters. The plan view size of the touch electrode 29 is much larger than that of a pixel, which will be described later. The touch electrode 29 extends to overlap the pixels both in the X-axis direction and the Y-axis direction.

Figure 3:
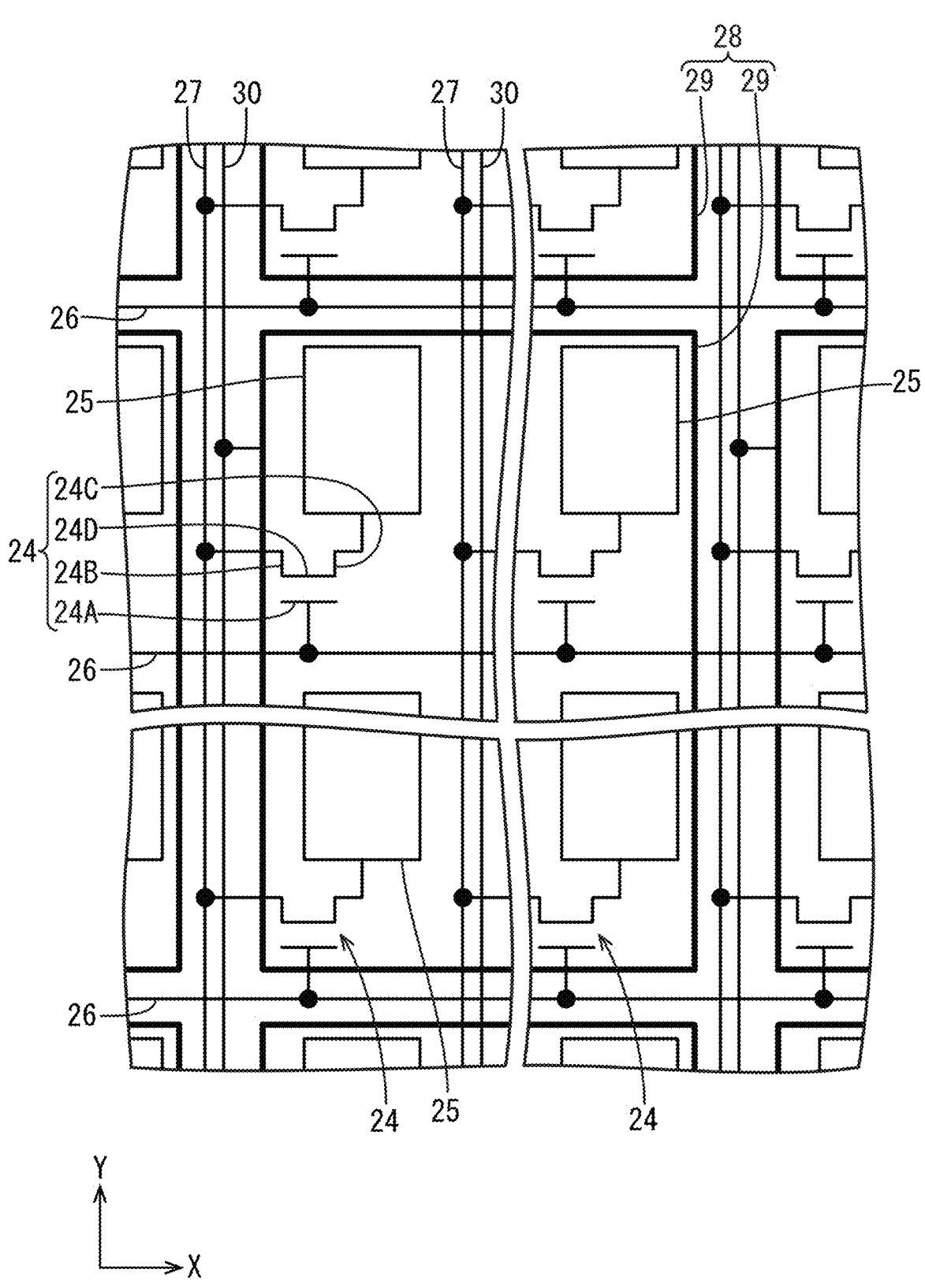
FIG. 3 is a circuit diagram illustrating an electrical configuration of an array substrate included in the liquid crystal panel according to the first embodiment.

Next, a configuration of the array substrate 21 in the display area AA will be described with reference to FIG. 3. As illustrated in FIG. 3, thin film transistors (TFTs) 24 (transistors, switching components) and pixel electrodes 25 are at least arranged in an inner surface area of the array substrate 21 in the display area AA. The TFTs 24 and the pixel electrodes 25 are arranged at intervals in a matrix (rows and columns) along the X-axis direction and the Y-axis direction. Gate lines 26 (scanning lines) and source lines 27 (image lines, signal lines) are routed perpendicular to each other (with crossing) to surround the TFTs 24 and the pixel electrodes 25. The gate lines 26 extend substantially straight in a direction substantially along the X-axis direction. The source lines 27 extend in a direction substantially along the Y-axis direction. The TFT 24 includes a gate electrode 24A that is connected to the gate line 26, a source electrode 24B that is connected to the source line 27, a drain electrode 24C that is connected to the pixel electrode 25, and a semiconductor section 24D that is connected to the source electrode 24B and the drain electrode 24C. The TFTs 24 are driven based on scan signals supplied to the gate electrodes 24A through the gate lines 26. Through the driving of the TFT 24, a potential related to the image signal (a data signal)

that is supplied to the source electrode 24B through the source line 27 from the driver 12 is supplied to the drain electrode 24C via the semiconductor section 24D. As a result, the pixel electrode 25 is charged at the potential related to the image signal. The pixel electrode 25 is arranged in an area surrounded by the gate lines 26 and the source lines 27 and has a substantially rectangular plan view shape.

As illustrated in FIG. 3, a common electrode 28 (an electrode) is formed to overlap all the pixel electrodes 25 on an inner surface side of the array substrate 21 in the display area AA. The common electrode 28 spreads over substantially an entire area of the display area AA. The touch electrodes 29 are portions of the common electrode 28. The common electrode 28 includes dividing slits for separating the adjacent touch electrodes 29 from each other. The common electrode 28 is divided into the touch electrodes 29 with a grid pattern in a plan view by the dividing slits and includes the touch electrodes 29 that are electrically independent from one another.

As illustrated in FIG. 3, touch lines 30 (position detection lines) that are connected to the touch electrodes 29, respectively, are disposed on an inner surface side of the array substrate 21 in the display area AA. The touch lines 30 extend substantially along the Y-axis direction and parallel to the source lines 27. The touch lines 30 are connected to the touch electrodes 29, respectively. The touch lines 30 are supplied with common signals (common potential signals) for the image display function and touch signals (position detection signals) for the touch function from the driver 12 at different timing. A period while the touch lines 30 are supplied with the common signals from the driver 12 is a display period and a period while the touch lines 30 are supplied with the touch signals from the driver 12 is a sensing period (a position detection period). The common signals are transmitted to all the touch lines 30 during the display period and thus all the touch electrodes 29 are charged at the reference potential and function as the common electrode 28.

Figure 4:
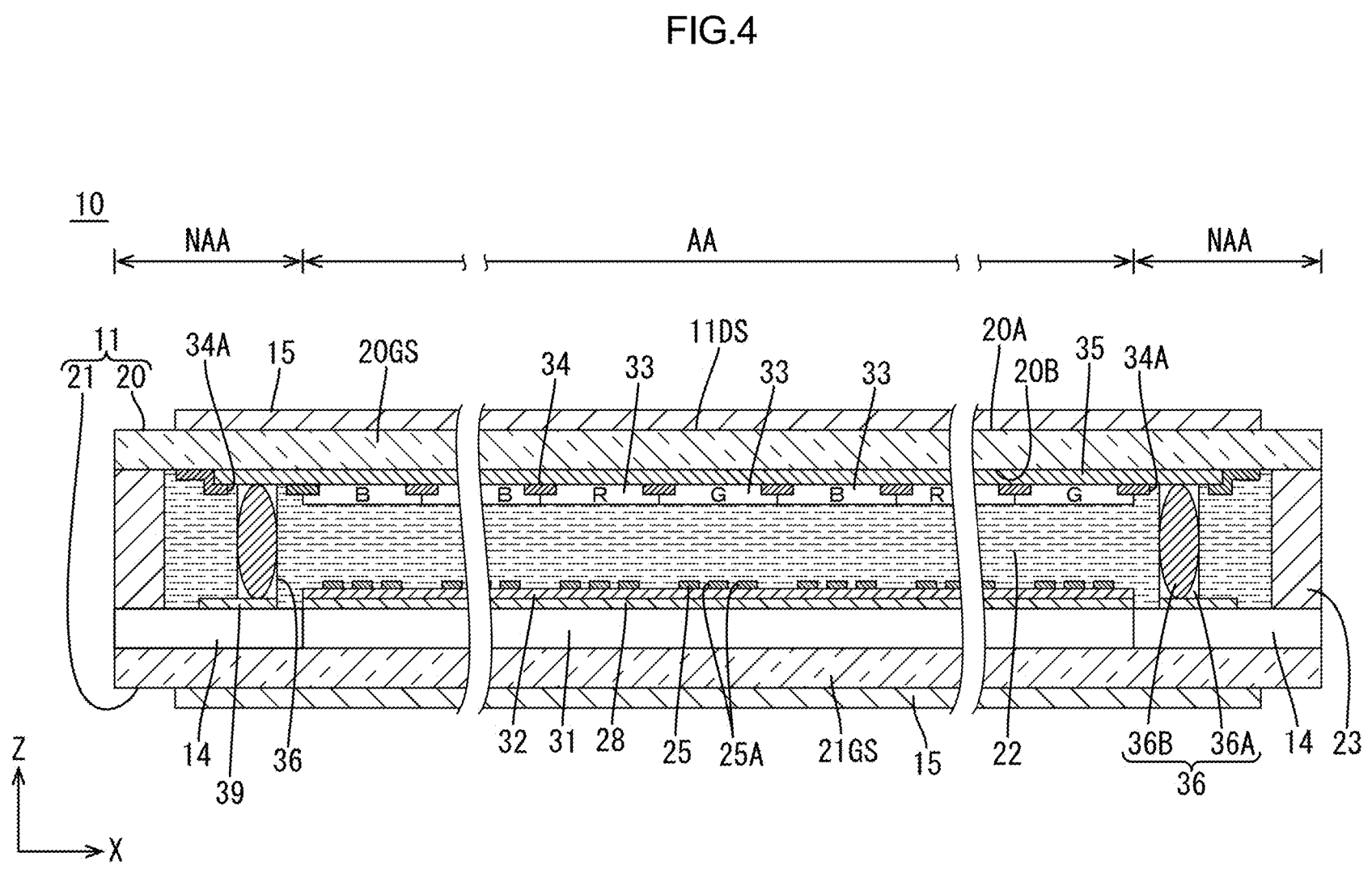

As illustrated in FIG. 4, a pixel circuit 31 and an alignment film are disposed on an inner surface side of the array substrate 21 in the display area AA. The alignment film is not illustrated. The pixel circuit 31 includes the TFTs 24, the gate lines 26, and the source lines 27 and is configured to supply a predefined potential to the pixel electrodes 25 at a predefined timing. The common electrode 28 is disposed below the pixel electrodes 25. In the array substrate 21 of this embodiment, between the pixel electrodes 25 and the common electrode 28, the pixel electrode 25 is defined as an upper electrode that is disposed in a layer above the layer including the common electrode 28 and the common electrode 28 is defined as a lower electrode that is disposed in a layer below the layer including the pixel electrodes 25. An insulating film 32 is disposed between the pixel electrodes 25 and the common electrode 28. The pixel electrodes 25 include slits 25A. The common electrode 28 is supplied with the common potential signal, which has a common potential (a reference potential), from the pixel circuit 31. The TFTs 24 are driven based on scan signals supplied through the gate lines 26. With the pixel electrode 25 being charged at the potential related to the image signal that is supplied to the source line 27 according to the driving of the TFT 24, a potential difference occurs between the pixel electrode 25 and the common electrode 28. Then, a fringe electric field (an oblique electric field) is created between an opening edge of a slit 25A of the pixel electrode 25 and the common electrode 28. The fringe electric field includes a component parallel to the plate surface of the array substrate 21 and a component normal to the plate surface of the array substrate 21. With the fringe electric field, orientations of the liquid crystal molecules included in the liquid crystal layer 22 can be controlled. Based on the orientations of the liquid crystal molecules, predefined display is performed. Namely, the liquid crystal panel 11 according to this embodiment operates in the fringe field switching (FFS) mode.

As illustrated in FIG. 4, color filters 33 that exhibit three different colors of blue (B), green (G), and red (R) are disposed in the display area AA on the inner surface side of the opposed substrate 20. The color filters 33 that exhibit different colors are arranged adjacent to each other along the gate lines 26 (in the X-axis direction). The color filters 33 that exhibit different colors extend along the source lines 27 (substantially the Y-axis direction). Namely, the color filters 33 that exhibit different colors are arranged in a stripe as a whole. The color filters 33 are arranged to overlap the pixel electrodes 25 of the array substrate 21, respectively, in a plan view. The color filter 33 and the corresponding pixel electrode 25 are configured as a pixel, which is a display unit. The color filters 33 that exhibit different colors are arranged such that a boundary therebetween (a color boundary) overlaps the source line 27. A light blocking portion 34 (an inter-pixel light blocking portion, a black matrix) is disposed on an inner surface side of the opposed substrate 20 and on a lower layer side of the color filters 33. The light blocking portion 34 is made of light blocking material having good light blocking properties. The light blocking portion 34 blocks light from the backlight unit. The light blocking portion 34 is formed in a grid pattern in a plan view in the display area AA to define each of the adjacent pixel electrodes 25 (pixels). The light blocking portion 34 is disposed to overlap at least the gate lines 26 and the source lines 27 on the array substrate 21 side. The light blocking portion 34 extends in substantially an entire area of the non-display area NAA. Alignment films for orienting the liquid crystal molecules in the liquid crystal layer 22 are formed on innermost surfaces (in an uppermost layer) of the substrates 20 and 21 in contact with the liquid crystal layer 22.

Figure 5:
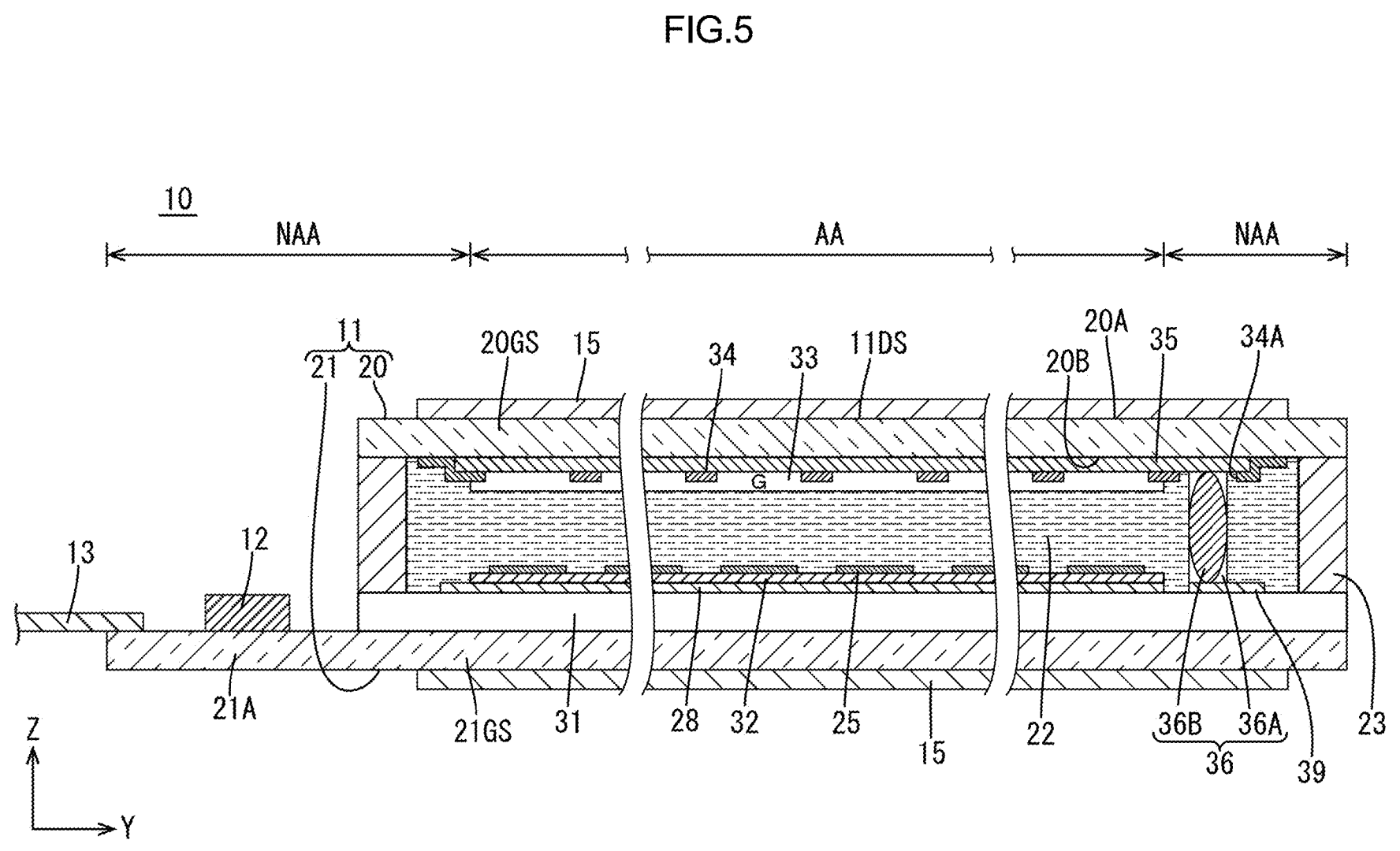
Figure 6:
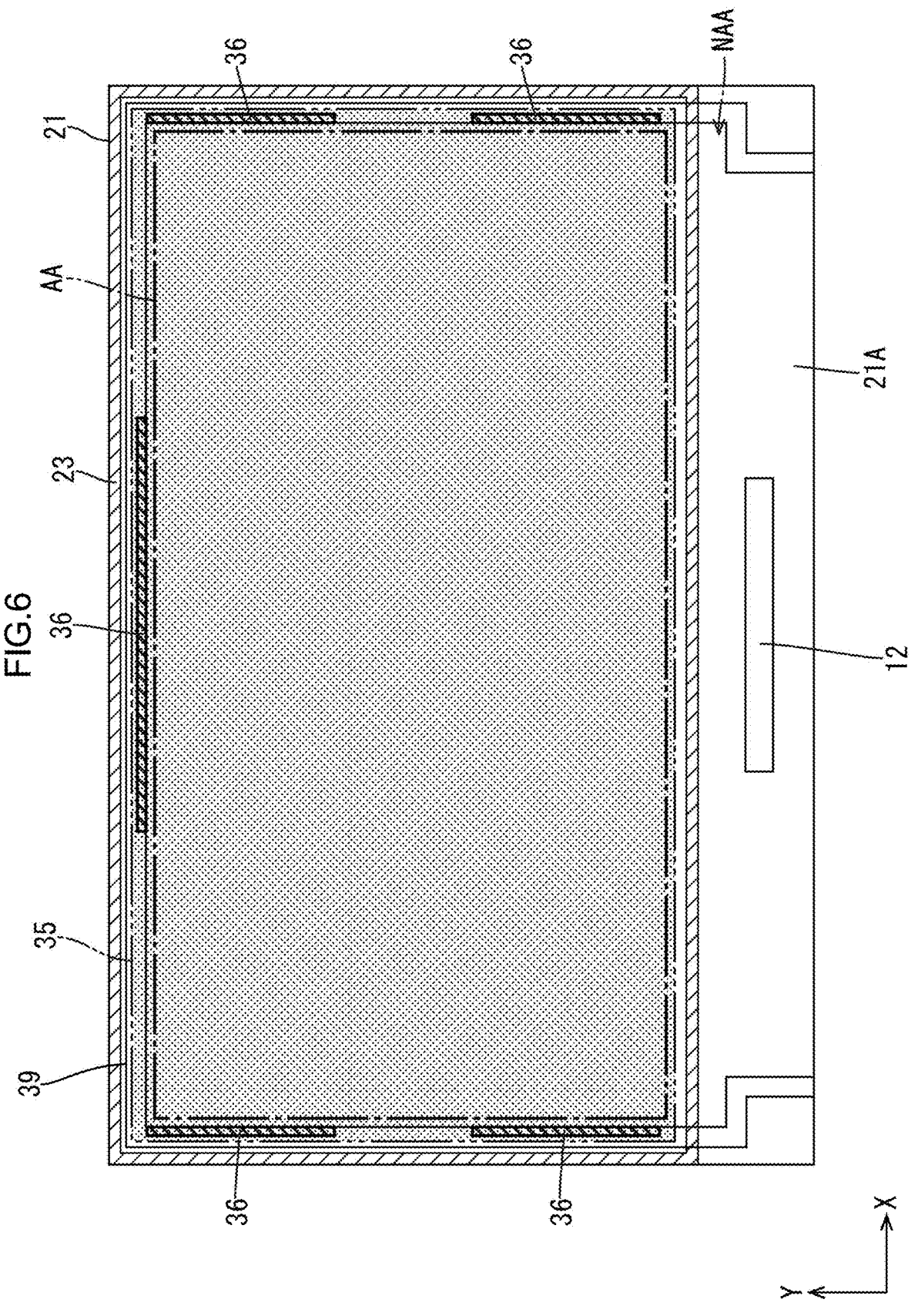
FIG. 6 is a cross-sectional view illustrating a planar configuration of an array substrate of the liquid crystal panel according to the first embodiment.

As illustrated in FIGS. 4 to 6, a conductive film 35 (an antistatic film) is disposed on the second surface 20B of the opposed substrate 20. In FIG. 6, a plan view area where the conductive film 35 is disposed is illustrated with a shading and the outline of the display area AA is illustrated with a chain line. The conductive film 35 is included in a layer lower (closer to the glass substrate 20GS) than the layer including the color filters 33 and the light blocking portion 34. Namely, the conductive film 35 is disposed directly on the second surface 20B of the opposed substrate 20. On the second surface 20B of the opposed substrate 20, the conductive film 35 is disposed to overlap the entire area of the display area AA of the display surface 11DS and also overlap an inner peripheral portion of the non-display area NAA that is next to the display area AA. Namely, the plan view forming area in which the conductive film 35 is formed is slightly greater than the display area AA and the outline of the plan view forming area of the conductive film 35 is slightly smaller than the outline of the non-display area NAA. The conductive film 35 is on an inner side of the sealing portion 23 and does not overlap the sealing portion 23. The conductive film 35 is disposed in a solid manner on a portion of the second surface 20B that is an inner area surrounded by the sealing portion 23. The plan view size of the common electrode 28 of the array substrate 21 is slightly smaller than that of the conductive film 35. Namely, the common electrode 28 overlaps the entire area of the display area AA on the display surface 11DS but does not overlap the non-display area NAA. In forming the conductive film 35 on the second surface 20B of the opposed substrate 20, the conductive film 35 that is disposed in a solid manner on the second surface 20B may be patterned with photolithography, or the second surface 20B that is selectively covered with a mask may be coated with a slit coater, or printing may be performed with a printing method such as ink jetting and rotogravure.

With the conductive film 35 being disposed on the opposed substrate 20 that includes the display surface 11DS with which position input (the touch operation) is performed by a user, buildup of static electricity on the opposed substrate 20 is reduced. Furthermore, since the conductive film 35 is disposed on the second surface 20B of the opposed substrate 20, a wide variety of materials can be used for the conductive film 35 compared to the configuration including the conductive film on the first surface 20A. With the conductive film being disposed on the first surface 20A, the conductive film is exposed on the display surface 11DS. Therefore, the material of the conductive film needs to have high chemical stability and hardness. In this respect, the conductive film 35 of this embodiment is disposed on the second surface 20B that is an opposite surface of the first surface 20A. Therefore, the conductive film 35 does not necessarily need to have high chemical stability and hardness and a wide variety of materials can be used for the conductive film 35.

Figure 7:
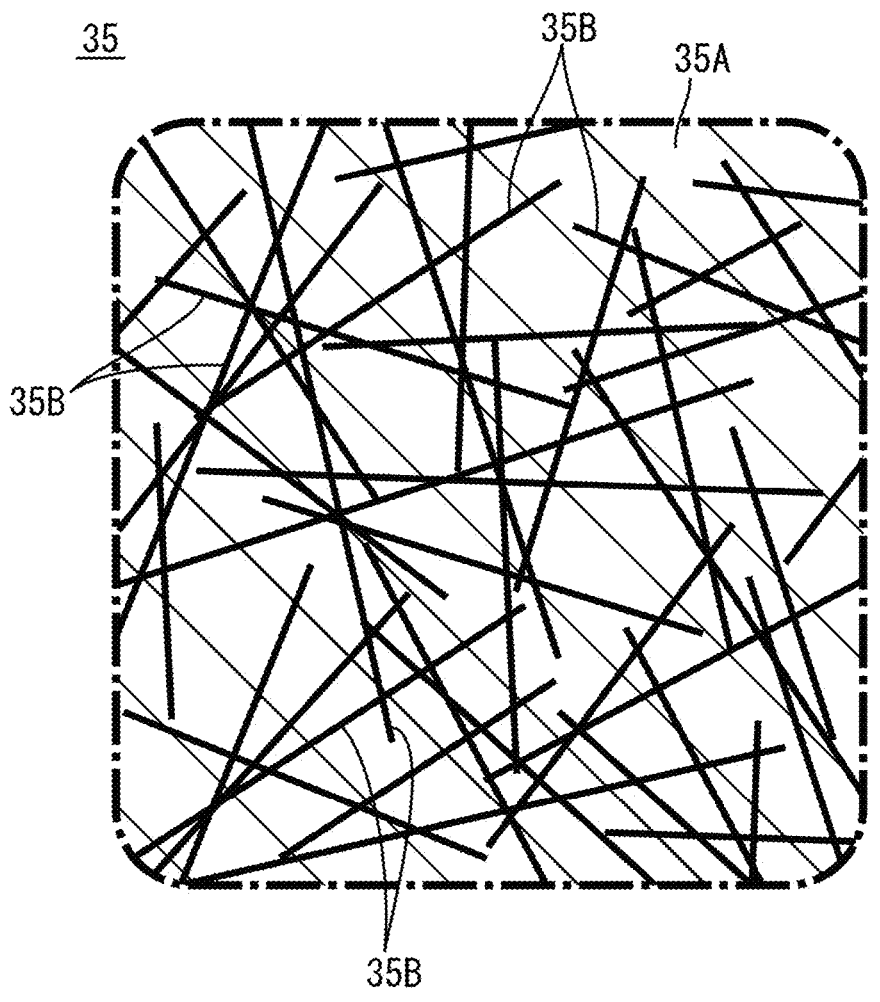
FIG. 7 is a cross-sectional view of a conductive film that is included in an opposed substrate and contains carbon nanotubes.
Figure 8:
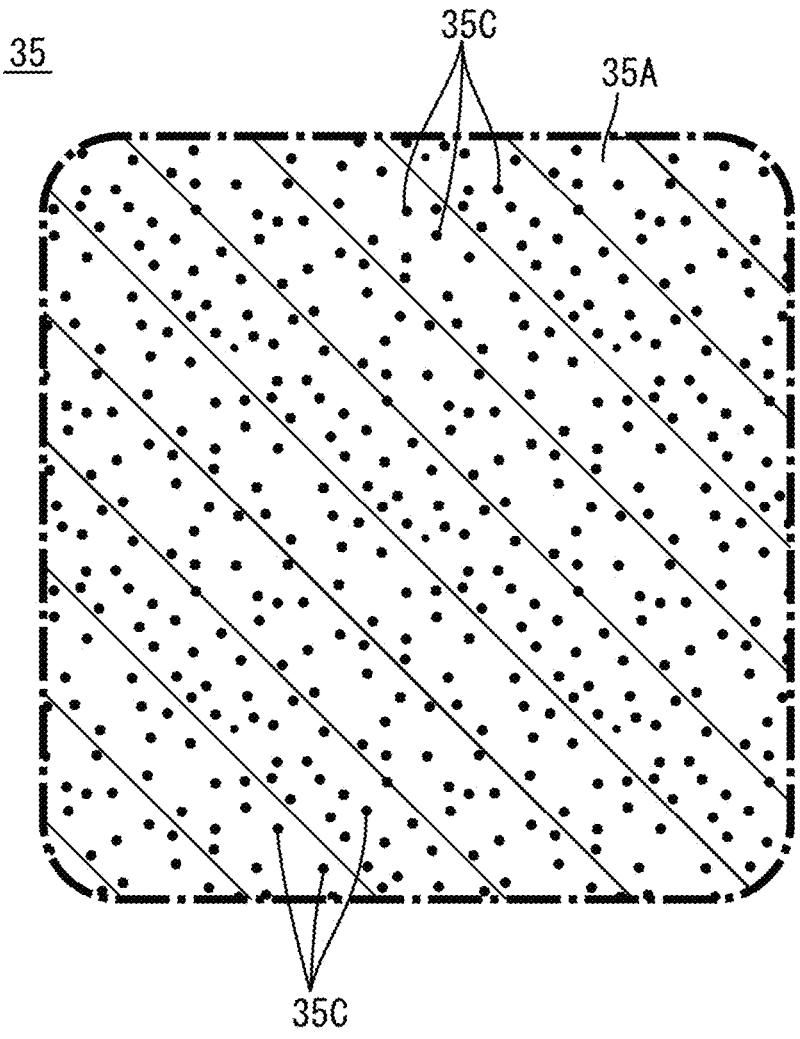
FIG. 8 is a cross-sectional view of a conductive film that is included in the opposed substrate and contains transparent electrode material.

In this embodiment, as illustrated in FIGS. 4 and 5, a wide variety of materials can be used for the conductive film 35 by disposing the conductive film 35 on the second surface 20B of the opposed substrate 20. In this respect, synthetic resin material having light transmissive properties is included in the conductive film 35. In this embodiment, as illustrated in FIGS. 7 and 8, insulating resin material 35A is included in the conductive film 35 as the synthetic resin material. Specifically, olefin resin material (such as polyethylene resin material and polypropylene resin material) and polyester resin material may be used for the conductive film 35 as the insulating resin material 35A. With polyethylene resin material being used as the insulating resin material 35A, the refractive index is about 1.54. With polypropylene resin material being used as the insulating resin material 35A, the refractive index is about 1.48. With polyester resin material being used as the insulating resin material 35A, the refractive index is about 1.6.

The conductive film 35 includes the insulating resin material 35A that is synthetic resin material having light transmissive properties. Therefore, the refractive index can be easily lowered by selecting a type of the insulating resin material 35A compared to a transparent electrode film only including transparent electrode material. Specifically, the refractive index of the commonly used transparent electrode film is about 2 to 2.1 and the refractive index of the insulating resin material 35A included in the conductive film 35 of this embodiment is about 1.48 to 1.6 and is lower than the refractive index of the commonly used transparent electrode film. The glass substrate 20GS of the opposed substrate 20 is made of glass material and the refractive index is about 1.52. Thus, the refractive index of the insulating resin material 35A of the conductive film 35 is lowered and therefore, the difference between the refractive index of the conductive film 35 and the refractive index of the opposed substrate 20 becomes smaller. Therefore, light is less likely to reflect off the interface between the conductive film 35 and the opposed substrate 20. This improves display quality (such as contrast properties) of the images displayed on the display area AA that overlaps the conductive film 35.

In this embodiment, the conductive film 35 includes the insulating resin material 35A and electrically conductive agent contained in the insulating resin material 35A. As illustrated in FIGS. 7 and 8, the conductive film 35 includes carbon nanotubes 35B or transparent electrode material 35C as the electrically conductive agent. The carbon nanotube 35B that is included in the conductive film 35 as the electrically conductive agent as illustrated in FIG. 7 is a single-walled carbon nanotube or a multi-walled carbon nanotube of a tube-in-tube structure made of carbon with a hexagonal lattice network (a graphene sheet). The carbon nanotube 35B has good electrical conductivity and good thermal conductivity. The carbon nanotube 35B is recognized as a linear shape (an elongated thin shape). Multiple linear-shaped carbon nanotubes 35B are dispersed in the insulating resin material 35A so as to cross and to be contacted with each other. As the content of the electrically conductive agent in the insulating resin material 35A increases, the refractive index of the conductive film 35 tends to become higher. In this respect, compared to the transparent electrode material 35C, even if the content of the carbon nanotubes 35B increases, the refractive index of the conductive film 35 is less likely to become higher. Therefore, with using the carbon nanotubes 35B as the electrically conductive agent, the conductive film 35 can keep low refractive index and the sheet resistance of the conductive film 35 can be effectively lowered. On the other hand, as illustrated in FIG. 8, the transparent electrode material 35C used as the electrically conductive agent is recognized as particles and multiple particles are dispersed in the insulating resin material 35A. Examples of the transparent electrode material include indium tin oxide (ITO), indium zinc oxide (IZO), and indium tin silicon oxide (ITSO). The transparent electrode material 35C includes at least indium (In). The light transmissive properties of the transparent electrode material 35C are higher than those of the carbon nanotubes 35B.

Thus, with the insulating resin material 35A including the electrically conductive agent, the conductive film 35 has electrical conductivity and effectively exerts the antistatic function. By selecting the type and the content of the electrically conductive agent included in the insulating resin material 35A, the electrically conductivity, that is sheet resistance, of the conductive film 35 can be adjusted. Specifically, the content of the electrically conductive agent in the insulating resin material 35A is determined such that the sheet resistance of the conductive film 35 is in a range from $1 \times 10^7$ $\Omega$/sq to $1 \times 10^9$ $\Omega$/sq. With the carbon nanotubes 35B being used as the electrically conductive agent, the content of the carbon nanotubes 35B is about 3 wt % (percent by weight) such that the sheet resistance of the conductive film 35 is in the above range. With the transparent electrode material 35C being used as the electrically conductive agent, the content of the transparent electrode material 35C is about 10 wt % such that the sheet resistance of the conductive film 35 is in the above range. The content of the carbon nanotubes 35B is smaller than the content of the transparent electrode material 35C. Generally, as the content of the electrically conductive agent increases, the light transmittance of the conductive film 35 tends to become lower. Therefore, by using the carbon nanotubes 35B as the electrically conductive agent, the light transmittance of the conductive film 35 is less likely to decrease due to the addition of the electrically conductive agent. The content of the transparent electrode material 35C is greater than that of the carbon nanotubes 35B. However, since the light transmissive properties of the transparent electrode material 35C are higher than those of the carbon nanotubes 35B, the light transmittance of the conductive film is less likely to decrease even with the content of the transparent electrode material 35C being increased. Therefore, with using the transparent electrode material 35C as the electrically conductive agent, the light transmittance of the conductive film 35 is less likely to decrease due to the addition of the electrically conductive agent.

The sheet resistance of the conductive film 35 is $1 \times 10^7$ $\Omega$/sq or higher. Therefore, compared to the sheet resistance of the conductive film being lower than $1 \times 10^7$ $\Omega$/sq, the electric field created by the touch electrode 29 when detecting the input position is less likely to be blocked by the conductive film 35. Accordingly, the signal intensity related to the touch signal that is transmitted via the touch line 30 is less likely to be decreased and therefore, good touch sensitivity (position detection sensitivity) can be maintained. Furthermore, the sheet resistance of the conductive film 35 is $1 \times 10^9$ $\Omega$/sq or lower. Therefore, compared to the sheet resistance of the conductive film being higher than $1 \times 10^9$ $\Omega$/sq, the antistatic function of the conductive film 35 can be sufficiently exerted.

The refractive index of the conductive film 35 that includes the insulating resin material 35A and the electrically conductive agent (the carbon nanotubes 35B or the transparent electrode material 35C) contained in the insulating resin material 35A is about 1.5 to 1.8. Specifically, with the conductive film 35 including olefin resin material as the insulating resin material 35A and the carbon nanotubes 35B as the electrically conductive agent, the refractive index of the conductive film 35 is about 1.6. With the conductive film 35 including polyethylene resin material as the insulating resin material 35A and ITO, which is one example of the transparent electrode material 35C, as the electrically conductive agent, the refractive index of the conductive film 35 is about 1.7. With the conductive film 35 including polyester resin material as the insulating resin material 35A and ITO, which is one example of the transparent electrode material 35C, as the electrically conductive agent, the refractive index of the conductive film 35 is about 1.8. Therefore, compared to the commonly-used transparent electrode film (the refractive index is about 2 to 2.1), the difference between the refractive index of the conductive film 35 of this embodiment and the refractive index of the glass substrate 20GS of the opposed substrate 20 becomes small. Accordingly, light is less likely to reflect off the interface between the conductive film 35 and the opposed substrate 20. Particularly, since the refractive index of the conductive film 35 is 1.8 or smaller, the difference between the refractive index of the conductive film 35 and the refractive index of the glass substrate 20GS of the opposed substrate 20 becomes effectively small and this embodiment is preferable to reduce the amount of reflected light. Accordingly, the display quality of the images displayed on the display area AA can be improved. With the refractive index of the conductive film 35 being 1.5 or higher, a wide variety of insulating resin materials 35A can be used for the conductive film 35.

As illustrated in FIGS. 4 and 5, connection portions 36 are disposed between the opposed substrate 20 and the array substrate 21 and connect the conductive film 35 and the common electrode 28. The connection portion 36 includes a base 36A made of photocuring resin or thermosetting resin and electrically conductive particles 36B that are dispersed in the base 36A. The base 36A of the connection portion 36 may be made of the same material as the sealing portion 23. With such a configuration, the sealing portion 23 and the connection portions 36 can be processed with coating and curing in the same process. For example, the electrically conductive particles 36B are synthetic resin particles that are processed with electrically conductive plating process such as gold plating on the surfaces of the particles. A particle size of the electrically conductive particles 36B is close to a cell gap of the liquid crystal panel 11 and is in a range from 4 μm to 8 μm, for example. The content of the electrically conductive particles 36B in the base 36A is about 0.5 wt %, for example. The plan view area where the electrically conductive particles 36B are arranged and the content of the electrically conductive particles 36B in the connection portion 36 are adjusted such that the connection resistance of the connection portion 36 is 1 KΩ or less.

As illustrated in FIG. 6, the connection portions 36 are disposed on the inner side of the sealing portion 23 or on the inner peripheral portion of the non-display area NAA. The connection portions 36 are disposed to overlap an outer edge portion of the conductive film 35 and a ground electrode 39. The connection portions 36 are arranged along the sealing portion 23 at intervals. Specifically, two connection portions 36 are disposed on each of Y-axis edge portions of the liquid crystal panel 11 at an interval with respect to the Y-axis direction. The four connection portions 36 have an elongated rectangular plan view shape extending along the Y-axis direction and are disposed near four corner portions in the non-display area NAA. The connection portion 36 is also disposed on the X-axis edge portion of the liquid crystal panel 11 that is on an opposite side from the other X-axis edge portion where the driver 12 and the flexible substrate 13 are disposed. The connection portion 36 is disposed in a middle of the X-axis edge portion of the liquid crystal panel 11 with respect to the X-axis direction and has an elongated rectangular shape extending along the X-axis direction. Thus, the connection portions 36 extend along the periphery of the sealing portion 23. The ground electrode 39 is included in the array substrate 21. The ground electrode 39 is disposed between the sealing portion 23 and the common electrode 28 and overlaps all the connection portions 36. The ground electrode 39 extends along the peripheral direction of the sealing portion 23. The ground electrode 39 has a plan view U shape. The ground electrode 39 extends along three sides of the common electrode 28 (the display area AA) with a space from the three sides. The ground electrode 39 is disposed outside the common electrode 28. The ground electrode 39 is not disposed adjacent to one of the sides of the common electrode 28 opposite the driver 12. Two ends of the ground electrode 39 with respect to the elongated direction thereof extend outside the sealing portion 23 and are disposed on the uncovered section 21A. The portions of the ground electrode 39 that are arranged on the uncovered section 21A are connected to terminals of the flexible substrate 13. The ground electrode 39 is kept at a ground potential by the flexible substrate 13.

The light blocking portion 34 that is disposed in substantially a solid manner in the non-display area NAA includes holes 34A in portions overlapping the connection portions 36 as illustrated in FIGS. 4 and 5. Since the conductive film 35 is included in a layer lower than the layer including the light blocking portion 34 in the opposed substrate 20, portions of the conductive film 35 overlapping the holes 34A are uncovered and defined as uncovered portions. The uncovered portions of the conductive film 35 that are exposed through the holes 34A are contacted with the electrically conductive particles 36B of the connection portions 36. On the other hand, the ground electrode 39 of the array substrate 21 is a portion of the metal film and the transparent electrode film that are included in a layer lower than the layer including the insulating film 32. Specifically, the ground electrode 39 may be a portion of the transparent electrode film a portion of which is configured as the common electrode 28. The insulating film 32 is not disposed in the non-display area NAA. The insulating film 32 includes cutouts in at least portions overlapping the connection portions 36. With such a configuration, the ground electrode 39 that is included in a layer lower than the layer including the insulating film 32 in the array substrate is uncovered. Portions of the ground electrode 39 that are not covered by the insulating film 32 and are exposed are contacted with the electrically conductive particles of the connection portions 36. With the connection portions 36 being connected to the conductive film 35 and the ground electrode 39, the conductive film 35 can be at the same potential as the ground electrode 39. Therefore, the conductive film 35 is always at the ground potential that is appropriate for static elimination. The conductive film 35, the connection portions 36, and the ground electrode 39 are disposed in an area inside the frame-shaped sealing portion 23. With such a configuration, moisture is less likely to enter the inside of the sealing portion 23 from the outside of the sealing portion 23 with respect to the conductive film 35.

Next, Comparative Experiment 1 that was performed to testify the effects of the liquid crystal panel 11 of this embodiment will be described. In Comparative Experiment 1, light reflectance was obtained with external light being supplied to each of the liquid crystal panels of Example 1, Comparative Example 1, and Reference Example. The liquid crystal panel 11 of Example 1 has the configuration of this embodiment previously described and includes the conductive film 35 that includes olefin resin material as the insulating resin material 35A and the carbon nanotubes 35B as the electrically conductive agent. The thickness of the conductive film 35 of Example 1 is about 100 nm and the content of the carbon nanotubes 35B is about 3 wt %. A commonly-used liquid crystal panel of Comparative Example 1 includes the transparent electrode film on the first surface 20A of the opposed substrate 20. The transparent electrode film of Comparative Example 1 includes ITSO as the transparent electrode material and the thickness is about 20 nm. Reference Example differs from Example 1 and Comparative Example 1 in that the conducive film 35 and the transparent electrode film are not included in the opposed substrate. Anti-reflection films are disposed on the outermost front surfaces of the liquid crystal panels of Example 1, Comparative Example 1, and Reference Example, respectively, to prevent light reflection.

Figure 9:
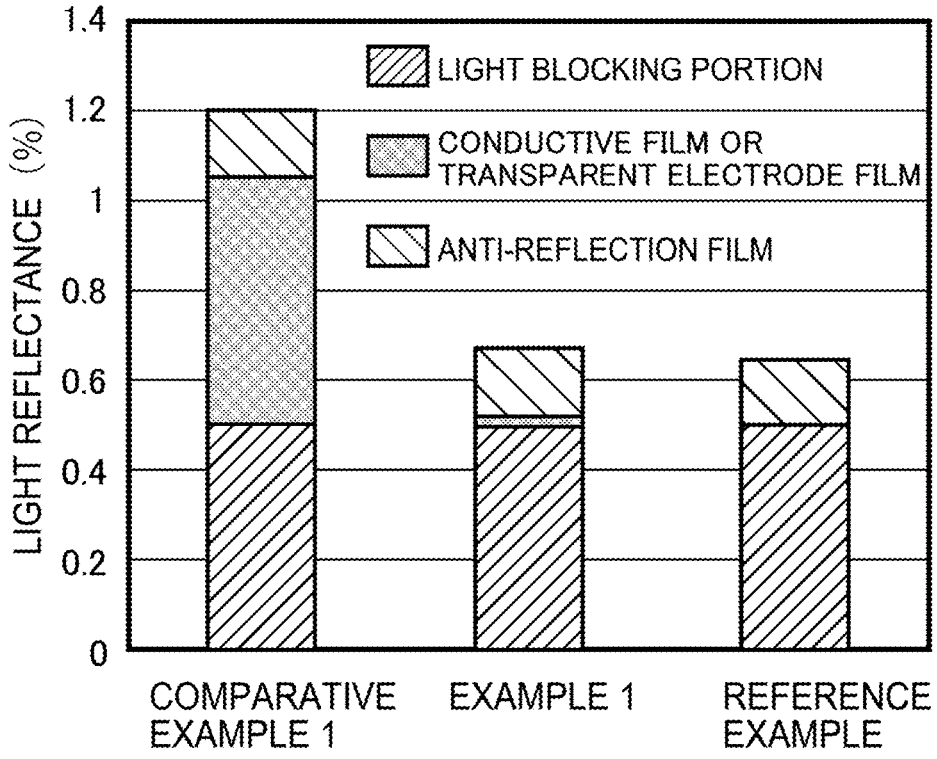
FIG. 9 is graphs representing experiment results of Comparative Experiment 1 according to the first embodiment.

In Comparative Experiment 1, the amount of reflection light obtained by supplying external light to each of the liquid crystal panels of Example 1, Comparative Example 1, and Reference Example was measured and the percentage of the ratio obtained by dividing the measured amount of reflection light by the amount of supplied external light was calculated as the light reflectance. In Comparative Experiment 1, the light reflectance of each of components that reflect the light was calculated for each of Example 1, Comparative Example 1, and Reference Example. The components reflecting the light include the light blocking portion, the anti-reflection film, and the conductive film 35 or the transparent electrode film. Experiment results of Comparative Experiment 1 are illustrated in FIG. 9. FIG. 9 illustrates bar charts representing light reflectance (unit is %) on the vertical axis and illustrates the light reflectance of Example 1, Comparative Example 1, and Reference Example. In FIG. 9, the light reflectance of the light blocking portion, the light reflectance of the anti-reflection film, and the light reflectance of the conductive film 35 or the transparent electrode film are illustrated with difference shadings.

Experiment results of Comparative Experiment 1 will be described. As is in FIG. 9, in each of Example 1, Comparative Example 1, and Reference Example, the light reflectance of the light blocking portion is 0.5% and the light reflectance of the anti-reflection film is 0.15%. In Comparative Example 1, the light reflectance of the transparent electrode film is 0.55%. In Example 1, the light reflectance of the conductive film 35 is 0.02%. In Reference Example, the light reflectance of the conductive film 35 or the transparent electrode film is 0% since the conductive film 35 and the transparent electrode film are not included. The light reflectance of the panel of Comparative Example 1 is 1.2% and the light reflectance of the panel of Example 1 is 0.67%. The light reflectance of the panel of Reference Example is 0.65%. The light reflectance of Example 1 is low and is almost a half of that of Comparative Example 1 and close to the light reflectance of Reference Example. In Example 1, with the conductive film 35 being disposed on the second surface 20B of the opposed substrate 20, reflection of external light is reduced in the liquid crystal panel 11.

Figure 10:
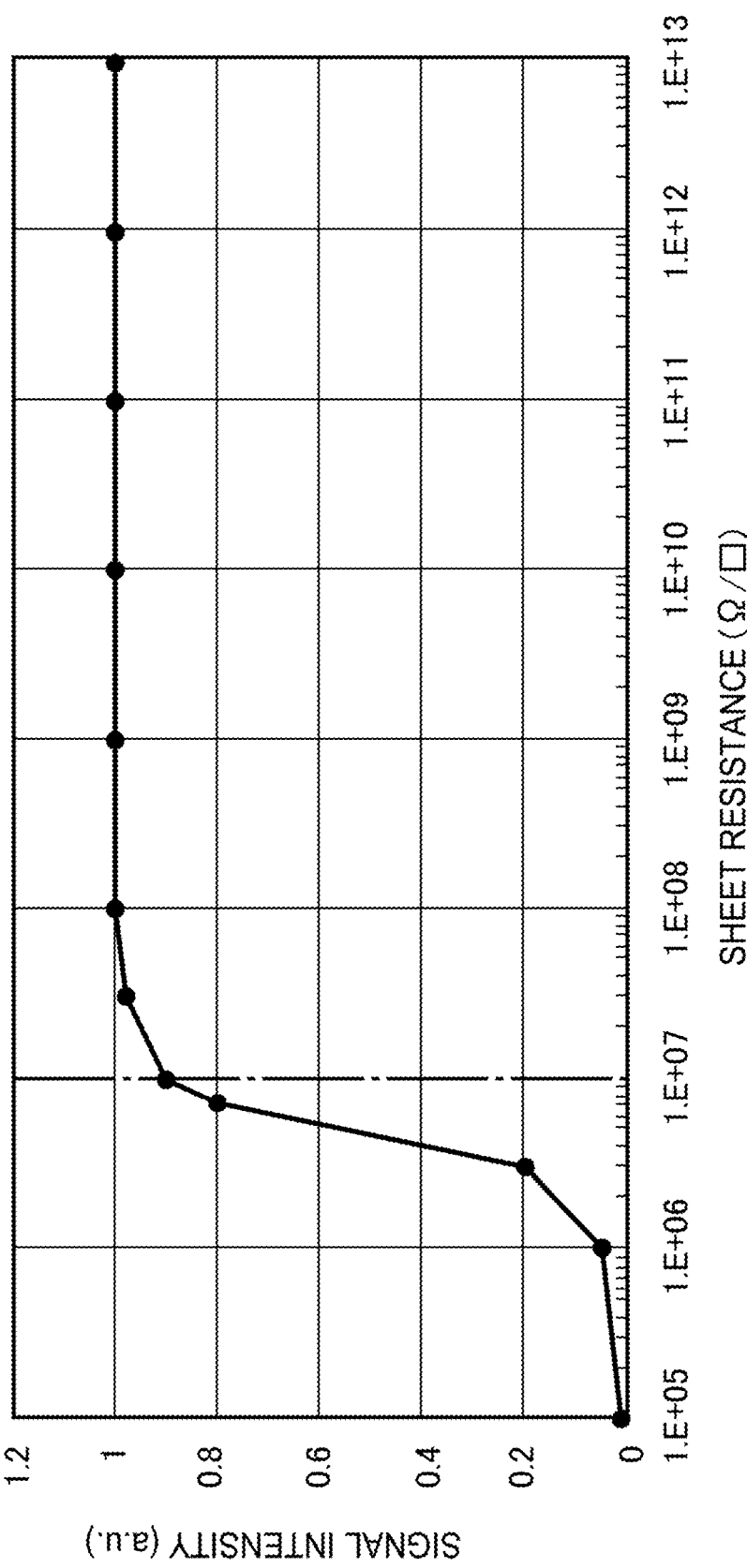
FIG. 10 is a graph representing experiment results of Verification Experiment 1 according to the first embodiment.

Next, Verification Experiment 1 was performed to know how the sheet resistance of the conductive film 35 and the signal intensity of the touch signals relate. In Verification Experiment 1, by adjusting the content of the carbon nanotubes 35B, which are electrically conductive agent, of Example 1 of Comparative Experiment 1, the conductive films 35 having the sheet resistances of $1\times10^5$ $\Omega$/sq, $1\times10^6$ $\Omega$/sq, $3\times10^6$ $\Omega$/sq, $7\times10^6$ $\Omega$/sq, $1\times10^7$ $\Omega$/sq, $3\times10^7$ $\Omega$/sq, $1\times10^8$ $\Omega$/sq, $1\times10^9$ $\Omega$/sq, $1\times10^{10}$ $\Omega$/sq, $1\times10^{11}$ $\Omega$/sq, $1\times10^{12}$ $\Omega$/sq, $1\times10^{13}$ $\Omega$/sq were produced. In Verification Experiment 1, the liquid crystal panels 11 having the conductive films 35 having the above sheet resistances, respectively, are prepared and the signal intensity of the touch signal that is detected in each liquid crystal panel 11 was measured. Experiment results of Verification Experiment 1 are illustrated in FIG. 10. FIG. 10 illustrates a graph representing the sheet resistance (unit is $\Omega$/sq) of the conductive film 35 on the lateral axis and the signal intensity (no unit) of the touch signal on the vertical axis. The signal intensities obtained with the sheet resistances are plotted in the graph. The signal intensity represents a relative value with a maximum value of the signal intensity of the detected touch signal being defined as a reference value (1.0).

Experiment results of Verification Experiment 1 will be described. As is in FIG. 10, with the sheet resistance of the conductive film 35 being below $1\times10^7$ $\Omega$/sq, the signal intensity tends to drop sharply. Particularly, with the sheet resistance of the conductive film 35 being lower than $7\times10^6$ $\Omega$/sq, the rate of change of the signal intensity increases and with the sheet resistance being or lower than $3\times10^6$ $\Omega$/sq, the signal intensity is 0.2 or lower. Thus, as the signal intensity drops, the touch sensitivity becomes worse and the input position is less likely to be detected correctly. It is presumed that the signal intensity drops because the conductive film 35 has high conductivity and the electric field created by the touch electrode 29 is blocked by the conductive film 35 at the time of touch detection. On the other hand, with the sheet resistance of the conductive film 35 being $1\times10^7$ $\Omega$/sq or higher, the signal intensity is 0.9 or higher and effective touch sensitivity can be obtained. Furthermore, with the sheet resistance of the conductive film 35 being $3\times10^7$ $\Omega$/sq or higher, the signal intensity is stably 1.0 and more effective touch sensitivity can be obtained. Thus, with the sheet resistance of the conductive film 35 being $1\times10^7$ $\Omega$/sq or higher, the conductivity of the conductive film 35 does not increase too much. Therefore, the electric field created by the touch electrode 29 is less likely to be blocked by the conductive film 35 at the time of touch detection. As a result, it is presumed that the signal intensity of the touch signal increases and is 0.9 or higher. Accordingly, effective high touch sensitivity can be obtained and the input position can be correctly detected.

Figure 11:
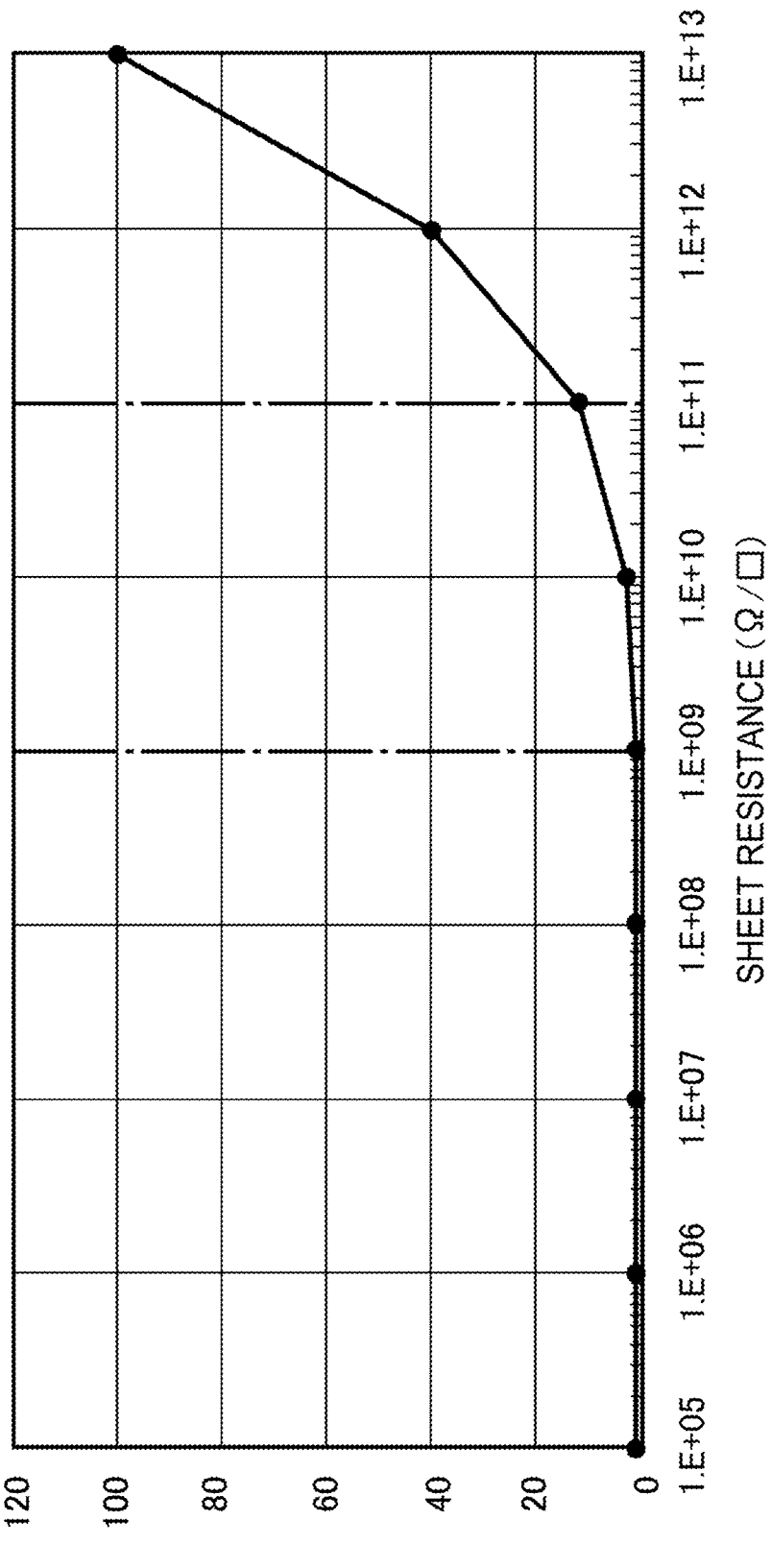
FIG. 11 is a graph representing experiment results of Verification Experiment 2 according to the first embodiment.

Next, Verification Experiment 2 was performed to know how the sheet resistance of the conductive film 35 and unevenness disappearing time relate. The unevenness disappearing time represents time necessary for the unevenness caused by static electricity disappearing. In Verification Experiment 2, by adjusting the content of the carbon nanotubes 35B, which is the electrically conductive agent, of Example 1 of Comparative Experiment 1, the conductive films 35 having the sheet resistances of $1\times10^5$ $\Omega$/sq, $1\times10^6$ $\Omega$/sq, $1\times10^7$ $\Omega$/sq, $1\times10^8$ $\Omega$/sq, $1\times10^9$ $\Omega$/sq, $1\times10^{10}$ $\Omega$/sq, $1\times10^{11}$ $\Omega$/sq, $1\times10^{12}$ $\Omega$/sq, $1\times10^{13}$ $\Omega$/sq were produced. In Verification Experiment 2, the liquid crystal panels 11 having the conductive films 35 having the above sheet resistances, respectively, are prepared, and with each liquid crystal panel 11 being displayed with black on an entire screen area, electrostatic discharge is caused at a predefined position on the display surface 11DS with using an electrostatic discharge simulator. In Verification Experiment 2, "ESS-S3011" made by Noise Laboratory Co., Ltd. was used as the electrostatic discharge simulator and the output voltage for discharging was ±20 KV. With discharging, charge unevenness, which is white, appears in the discharge portion of the display area AA. In Verification Experiment 2, the time necessary from the discharging until the white charge unevenness disappears was measured as the disappearing time. Experiment results of Verification Experiment 2 are illustrated in FIG. 11. FIG. 11 illustrates a graph representing the sheet resistance (unit is $\Omega$/sq) of the conductive film 35 on the lateral axis and the disappearing time (unit is s (seconds)) on the vertical axis. The disappearing time represents time necessary for the charge unevenness disappearing the vertical axis. The disappearing time with the above sheet resistances are plotted in the graph.

Experiment results of Verification Experiment 2 will be described. As is in FIG. 11, with the sheet resistance of the conductive film 35 being higher than $1\times10^9$ $\Omega$/sq, the disappearing time tends to increase. Particularly, with the sheet resistance of the conductive film 35 being higher than $1\times10^{11}$ $\Omega$/sq, the rate of change of the disappearing time sharply increases. With the sheet resistance being or higher than $1\times10^{11}$ $\Omega$/sq, the disappearing time is 20 seconds or longer. With the sheet resistance being or higher than $1\times10^{12}$ $\Omega$/sq, the disappearing time is 40 seconds or longer. With the disappearing time is 20 seconds or longer, the charge unevenness remains on the display surface too long and this degrades display quality. It is presumed that the disappearing time increases because the sheet resistance of the conductive film 35 is too high and the antistatic function of the conductive film 35 is not exerted. On the other hand, with the sheet resistance of the conductive film 35 being $1\times10^{11}$ $\Omega$/sq or lower, the disappearing time is shorter than 20 seconds the display quality is less likely to be lowered due to remaining of the charge unevenness. With the sheet resistance of the conductive film 35 being $1\times10^{11}$ $\Omega$/sq or lower, the rate of change of the disappearing time decreases and the disappearing time gradually decreases. When the sheet resistance of the conductive film 35 is $1 \times 10^{10}$ Ω/sq or lower, the disappearing time becomes close to one second. If the sheet resistance of the conductive film 35 is $1 \times 10^{9}$ Ω/sq or lower, the disappearing time is less than one second and becomes stable and the antistatic function of the conductive film 35 can be effectively exerted. Thus, with the sheet resistance of the conductive film 35 being $1 \times 10^{9}$ Ω/sq or lower, charge unevenness, which may be caused, can instantly disappear by the effect of the conductive film 35. Therefore, good display quality can be obtained.

Next, in addition to Example 1, Comparative Example 1, and Reference Example of Comparative Experiment 1, Examples 2, 3 and Comparative Example 2 are prepared. Examples 2, 3 and Comparative Example 2 include conductive films 35 and transparent electrode films having different configurations of those of Example 1 and Comparative Example 1. The refractive index of the conductive films 35 and the transparent electrode films of each of Examples 1 to 3, Comparative Example 1 and 2, and Reference Example were obtained and light reflectance was obtained with external light being supplied to each of the liquid crystal panels of Examples 1 to 3, Comparative Examples 1 and 2, and Reference Example. Example 2 is similar to Example 1 except that the conductive film 35 includes polyethylene resin material as the insulating resin material 35A and ITO, which is the transparent electrode material 35C, as the electrically conductive agent. The conductive film 35 of Example 2 has a thickness of about 600 nm and the content of ITO, which is the transparent electrode material 35C, is about 10 w %. Example 3 is similar to Example 1 except that the conductive film 35 includes polyester resin material as the insulating resin material 35A and ITO, which is the transparent electrode material 35C, as the electrically conductive agent. The conductive film 35 of Example 3 has a thickness of about 600 nm and the content of ITO, which is the transparent electrode material 35C, is about 10 w %. Comparative Example 2 includes the transparent electrode film on the first surface 20A of the opposed substrate 20 similar to Comparative Example 1. The transparent electrode film of Comparative Example 2 includes ITO as the transparent electrode material and the thickness is about 20 nm. Anti-reflection films are disposed on the outermost front surfaces of the liquid crystal panels of Examples 1 to 3, Comparative Examples 1 and 2, and Reference Example, respectively, to prevent light reflection.

Figures 12, 13:
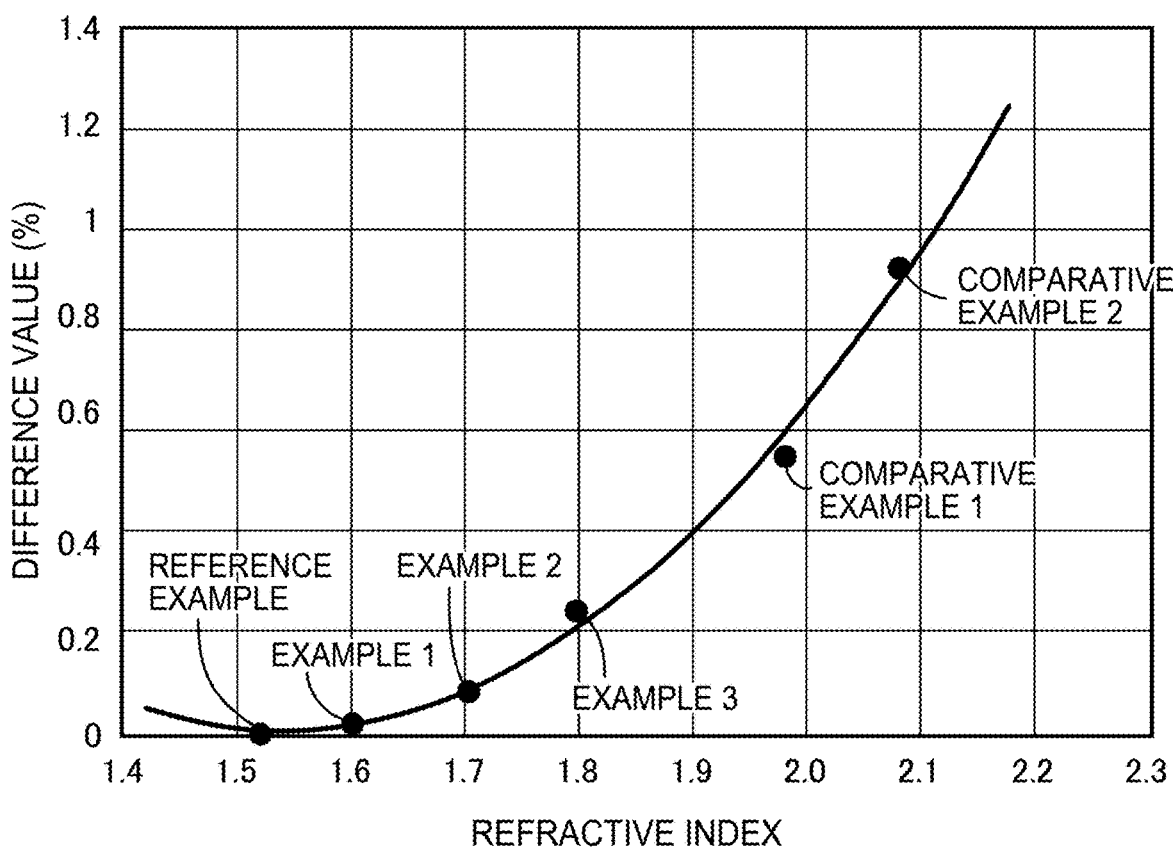
FIG. 12 is a table representing experiment results of Comparative Experiment 2 according to the first embodiment.
FIG. 13 is a graph representing experiment results of Comparative Experiment 2 according to the first embodiment.

In Comparative Experiment 2, the refractive index of the conductive film 35 and the transparent electrode film included in each of the liquid crystal panels of Examples 1 to 3 and Comparative Examples 1 and 2 was measured and the reflective index of the glass substrate 20GS of the opposed substrate 20 of Reference Example was measured. In Comparative Experiment 2, similar to Comparative Experiment 1, the amount of reflection light generated by supplying external light to each of the liquid crystal panels of Examples 1 to 3, Comparative Examples 1 and 2, and Reference Example was measured and the percentage of the ratio obtained by dividing the measured amount of reflection light by the amount of supplied external light was calculated as the light reflectance. Furthermore, in Comparative Experiment 2, difference between the light reflectance of each of Examples 1 to 3, Comparative Examples 1 and 2, and Reference Example and the light reflectance (0.65%) of Reference Example was obtained as a difference value. The difference value of light reflectance represents increase of the light reflectance that is obtained by including the conductive film 35 and the transparent electrode film. Experiment results of Comparative Experiment 2 are illustrated in FIGS. 12 and 13. FIG. 12 illustrates a table illustrating the refractive indexes, the light reflectance, and the difference values of Examples 1 to 3, Comparative Examples 1 and 2, and Reference Example. In FIG. 12, the refractive index of Reference Example represents refractive index of the glass substrate 20GS and the value (1.52) is illustrated with brackets. FIG. 13 illustrates a graph representing the refractive index on the lateral axis and the difference values (unit is %) of the light reflectance on the vertical axis. In FIG. 13, the results of Examples 1 to 3, Comparative Examples 1 and 2, and Reference Example are plotted on the graph.

Experiment results of Comparative Experiment 2 will be described. As is in FIG. 12, the refractive index of the conductive film 35 of Example 1 is 1.6, the refractive index of the conductive film 35 of Example 2 is 1.7, the refractive index of the conductive film 35 of Example 3 is 1.8, the refractive index of the transparent electrode film of Comparative Example 1 is 1.98, and the refractive index of the transparent electrode film of Comparative Example 2 is 2.08. Difference in the refractive index between Example 1 and Reference Example (the glass substrate 20GS) is 0.08, difference in the refractive index between Example 2 and Reference Example is 0.18, difference in the refractive index between Example 3 and Reference Example is 0.28, difference in the refractive index between Comparative Example 1 and Reference Example is 0.46, and difference in the refractive index between Comparative Example 2 and Reference Example is 0.56. Thus, the difference in the refractive index with respect to Reference Example is smallest in Example 1 and largest in Comparative Example 2. The light reflectance of the conductive film 35 of Example 1 is 0.67%, the light reflectance of the conductive film 35 of Example 2 is 0.73%, the light reflectance of the conductive film 35 of Example 3 is 0.89%, the light reflectance of the transparent electrode film of Comparative Example 1 is 1.2%, and the light reflectance of the transparent electrode film of Comparative Example 2 is 1.57%. The difference value of the light reflectance of Example 1 with respect to that of Reference Example is 0.02%, the difference value of the light reflectance of Example 2 with respect to that of Reference Example is 0.08%, the difference value of the light reflectance of Example 3 with respect to that of Reference Example is 0.24%, the difference value of the light reflectance of Comparative Example 1 with respect to that of Reference Example is 0.55%, and the difference value of the light reflectance of Comparative Example 2 with respect to that of Reference Example is 0.92%. Thus, the difference in the light reflectance with respect to Reference Example is smallest in Example 1 and largest in Comparative Example 2.

As is in FIG. 13, as the refractive index increases and becomes higher than 1.52, which is the refractive index of Reference Example, the difference value of the light reflectance increases. As the difference in the refractive index with respect to Reference Example increases, the rate of change of the difference value of light reflectance tends to increase. Particularly, with the refractive index being higher than 1.8, the rate of change of the difference value of light reflectance tends to increase sharply. The difference value of light reflectance of Comparative Example 1 is twice or more of that of Example 3. The difference value of light reflectance of Comparative Example 2 is slightly less than four times of that of Example 3. That is, the difference value of light reflectance of Example 3 is smaller than a half of that of Comparative Example 1 and reflection of external light is effectively reduced in Example 3. The difference value of light reflectance of Examples 1 and 2 is much smaller than that of Example 3 and is smaller than 0.1%. Therefore, with the refractive index of the conductive film 35 being in a range from 1.5 to 1.8 (difference in the refractive index with respect to the glass substrate 20GS is in a range from −0.02 to 0.28), the difference of light reflectance can be smaller than a half of Comparative Example 1. Therefore, reflection of external light is effectively reduced. Furthermore, the refractive index of the conductive film 35 being in a range from 1.5 to 1.7 (difference in the refractive index with respect to the glass substrate 20GS is in a range from −0.02 to 0.18), the difference of light reflectance can be smaller than 0.1%. Therefore, reflection of external light is effectively reduced.

According to Experiment results of Comparative Experiments 1 and 2 and Verification Experiments 1 and 2, the conductive film 35 is preferably configured such that the sheet resistance is from $1\times10^7$ Ω/sq to $1\times10^9$ Ω/sq and the refractive index is from 1.5 to 1.8 (more preferably from 1.5 to 1.7). With the sheet resistance of the conductive film 35 being $1\times10^7$ Ω/sq or higher, the electric field created by the touch electrode 29 is less likely to be blocked by the conductive film 35 and the touch panel function can be exerted effectively. With the sheet resistance of the conductive film 35 being $1\times10^9$ Ω/sq or lower, the antistatic function of the conductive film 35 can be effectively exerted and display errors is less likely to be caused by the charge unevenness that remains on the screen for a long time. With the refractive index of the conductive film 35 being 1.8 or smaller, the difference in the refractive index between the glass substrate 20GS of the opposed substrate 20 and the conductive film 35 becomes sufficiently small and the amount of reflection light is effectively reduced. With the refractive index of the conductive film 35 being 1.5 or higher, a wide variety of materials of the insulating resin material 35A can be used for the conductive film 35.

As previously described, the liquid crystal panel 11 (a display device) of this embodiment includes the opposed substrate 20 (a first substrate) having the first surface 20A (one surface) as the display surface 11DS, the array substrate 21 (a second substrate) disposed opposite the second surface 20B (other surface) of the opposed substrate 20 that is an opposite surface of the display surface 11DS, and the conductive film 35 disposed on the second surface 20B of the opposed substrate 20. The display surface 11DS of the opposed substrate 20 is divided into the display area AA displaying an image and the non-display area NAA displaying no image. The conductive film 35 is disposed to overlap at least the display area AA and includes synthetic resin material having light transmissive properties.

With the opposed substrate 20 including the conductive film 35, the opposed substrate 20 including the first surface 20A as the display surface 11DS is less likely to be statically charged. Since the conductive film 35 is disposed on the second surface 20B of the opposed substrate 20, a wide variety of materials can be used for the conductive film 35 compared to the configuration including the conductive film on the first surface 20A. Since the conductive film 35 includes synthetic resin material having light transmissive properties, the refractive index can be easily lowered compared to a transparent electrode film only including transparent electrode material such as indium zinc tin oxide (IZTO). Therefore, the difference in the refractive index between the conductive film 35 and the opposed substrate 20 can be made smaller and light is less likely to reflect off the interface between the conductive film 35 and the opposed substrate 20. Accordingly, display quality of images displayed on the display area AA that overlaps the conductive film 35 can be improved.

The sheet resistance of the conductive film 35 is in a range from $1\times10^7$ Ω/sq to $1\times10^9$ Ω/sq. With the sheet resistance of the conductive film 35 being $1\times10^7$ Ω/sq or higher, the electric field is less likely to be blocked by the conductive film 35. Lowering of the function of the liquid crystal panel 11 due to blocking of electric field is less likely to be caused. With the sheet resistance of the conductive film 35 is $1\times10^9$ Ω/sq or lower, the antistatic function of the conductive film 35 can be sufficiently exerted.

The array substrate 21 includes the touch electrodes 29 (position detection electrodes) that create a capacitance with the position input body that performs position input and the touch lines 30 (position detection lines) that are connected to the touch electrodes 29 and transmit position detection signals. With the sheet resistance of the conductive film 35 being $1\times10^7$ Ω/sq or higher, the electric field created by the touch electrode 29 when detecting input positions is less likely to be blocked by the conductive film 35. Accordingly, signal intensity of the position detection signals that are transmitted via the touch lines 30 is less likely to be lowered and high position detection sensitivity can be maintained.

The opposed substrate 20 is made of glass material and the refractive index of the conductive film 35 is from 1.5 to 1.8. The refractive index of the opposed substrate 20 made of glass material is about 1.5. On the other hand, the refractive index of the conductive film 35 is 1.8 or lower. Therefore, difference in the refractive index between the conductive film 35 and the opposed substrate 20 becomes sufficiently small and the amount of reflection light is preferably reduced. With the refractive index of the conductive film 35 being 1.5 or higher, a wide variety of synthetic resin material can be used for the conductive film 35.

The liquid crystal panel 11 further includes the frame-shaped sealing portion 23, the ground electrode 39 (electrode), and the connection portions 36. The sealing portion 23 is disposed between the outer edge portions of the opposed substrate 20 and the array substrate 21. The ground electrode 39 is included in the array substrate 21 and disposed on the inner side of the sealing portion 23. The ground electrode 39 is charged at the ground potential. The connection portions 36 are disposed between the opposed substrate 20 and the array substrate 21 and on the inner side of the sealing portion 23. The connection portions 36 are connected to the conductive film 35 and the ground electrode 39. The conductive film 35 is disposed on the inner side of the sealing portion 23. With the conductive film 35 being connected to the ground electrode 39 via the connection portions 36, the conductive film 35 is maintained at the ground potential. With the conductive film 35, the connection portions 36, and the ground electrode 39 being disposed on the inner side of (inside) the frame-shaped sealing portion 23, moisture is less likely to enter the inside of the sealing portion 23 where the conductive film 35 is disposed.

The conductive film 35 includes the insulating resin material 35A as the synthetic resin material and the electrically conductive agent contained in the insulating resin material 35A. The refractive index of the conductive film 35 can be adjusted by using different kinds of insulating resin material 35A. Therefore, the difference in the refractive index between the conductive film 35 and the opposed substrate 20 can be preferably reduced. The sheet resistance of the conductive film 35 can be adjusted by selecting the kind and the content of the electrically conductive agent. Therefore, lowering of the function of the liquid crystal panel 11 due to blocking of electric field by the conductive film 35 is less likely to be caused and the antistatic function of the conductive film 35 can be preferably exerted.

The conductive film 35 includes the carbon nanotubes 35B as the electrically conductive agent. With the carbon nanotubes 35B being included in the insulating resin material 35A as the electrically conductive agent, the refractive index of the conductive film 35 is less likely to be increased due to the carbon nanotubes 35B. Accordingly, the sheet resistance of the conductive film 35 can be effectively lowered with keeping low refractive index of the conductive film 35.

The conductive film 35 includes the transparent electrode material 35C that includes indium (In) as the electrically conductive agent. The insulating resin material 35A includes the transparent electrode material 35C containing In as the electrically conductive agent. Therefore, high light reflectance of the conductive film 35 can be kept.

Second Embodiment

A second embodiment will be described with reference to FIG. 14. The second embodiment includes a conductive film 135 that differs from the conductive film 35. Configurations, operations, and effects similar to those of the first embodiment may not be described.

Figure 14:
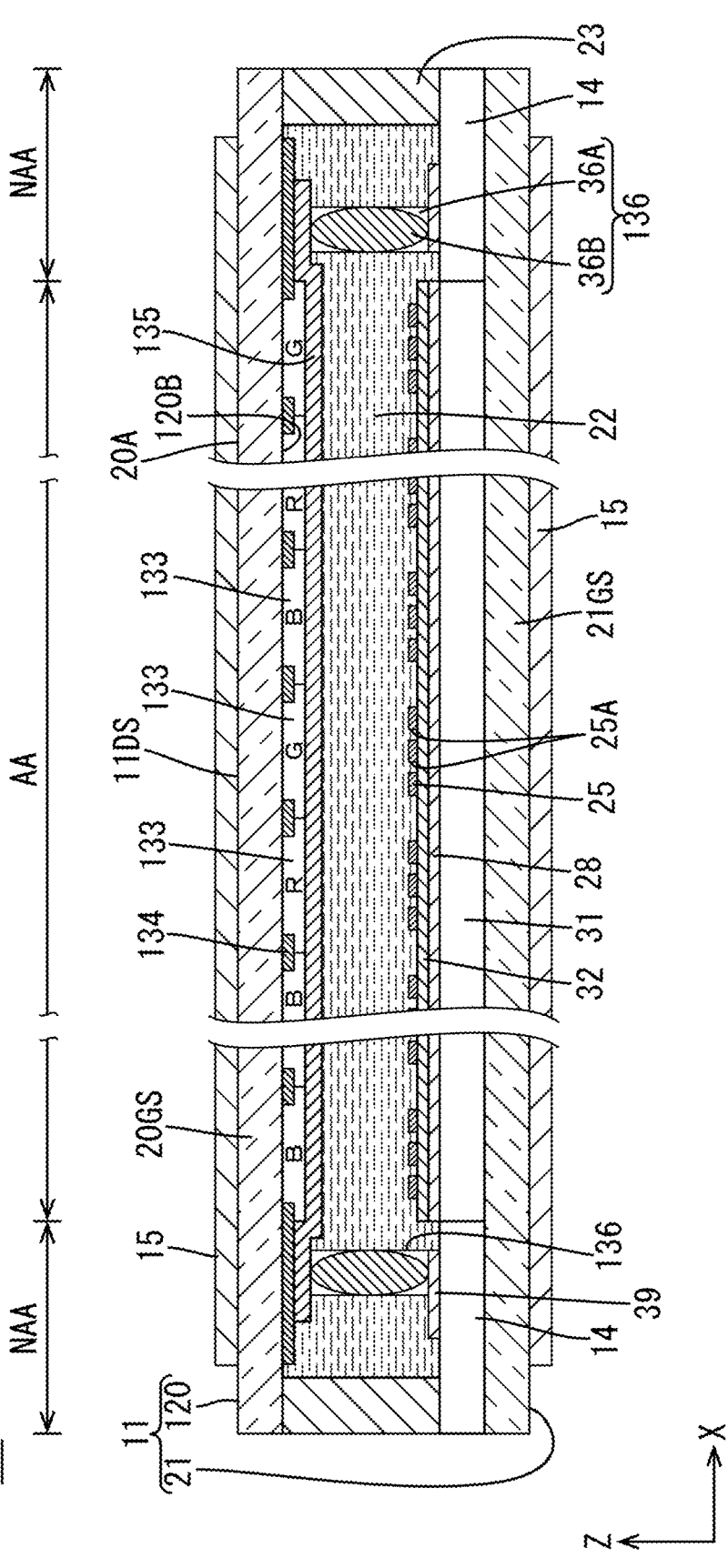
FIG. 14 is a cross-sectional view of a liquid crystal panel according to a second embodiment.

As illustrated in FIG. 14, the conductive film 135 of this embodiment is included in a layer upper than the layer including color filters 133 on a second surface 120B of an opposed substrate 120. In this embodiment, a light blocking portion 134 is not disposed between the conductive film 135 and connection portions 136. Therefore, the light blocking portion 134 does not include the holes 34A (refer to FIG. 4) of the first embodiment in the portions overlapping the connection portions 136. With such a configuration, the light blocking properties of the light blocking portion 134 can be exerted effectively in the non-display area NAA and display quality can be preferably improved.

Third Embodiment

A third embodiment will be described with reference to FIG. 15. The third embodiment includes a conductive film 235 having a configuration different from the configuration of the first embodiment. Configurations, operations, and effects similar to those of the first embodiment may not be described.

Figure 15:
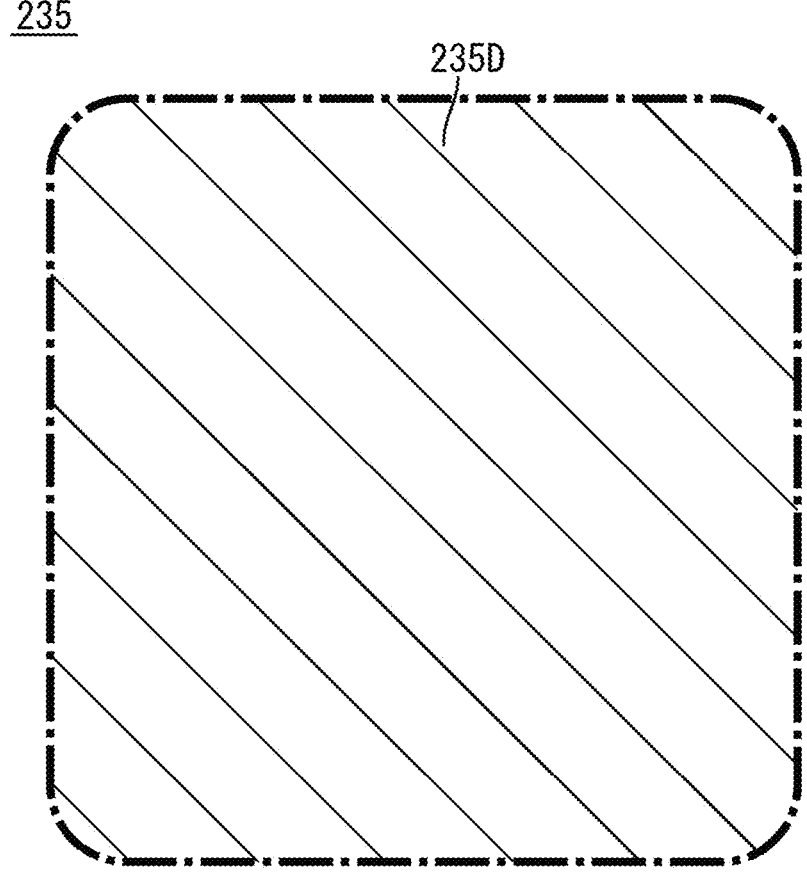
FIG. 15 is a cross-sectional view of a conductive film according to a third embodiment that is included in the opposed substrate and made of conductive polymer material.

As illustrated in FIG. 15, the conductive film 235 of this embodiment includes conductive polymer material 235D as the synthetic resin material. The conductive polymer material 235D exerts electrically conductive properties without containing electrically conductive agent. Examples of the conductive polymer material 235D include polyacetylene resin material and polythiophene resin material. The insulating resin material 35A of the conductive film 35 of the first embodiment includes electrically conductive agent (refer to FIGS. 7 and 8). However, the conductive film 235 of this embodiment does not need to include electrically conductive agent. Therefore, the conductive film 235 can keep low refractive index and high light reflectance.

As previously described, according to this embodiment, the conductive film 235 includes the conductive polymer material 235D as the synthetic resin material. With this configuration, the conductive film 235 does not need to include the electrically conductive agent unlike the conductive film that includes the insulating resin material 35A containing the electrically conductive agent. Therefore, the conductive film 235 can keep low refractive index and high light reflectance.

Fourth Embodiment

A fourth embodiment will be described with reference to FIG. 16. The fourth embodiment includes a conductive film 335 that differs from the conductive film 35 of the first embodiment. Configurations, operations, and effects similar to those of the first embodiment may not be described.

Figure 16:
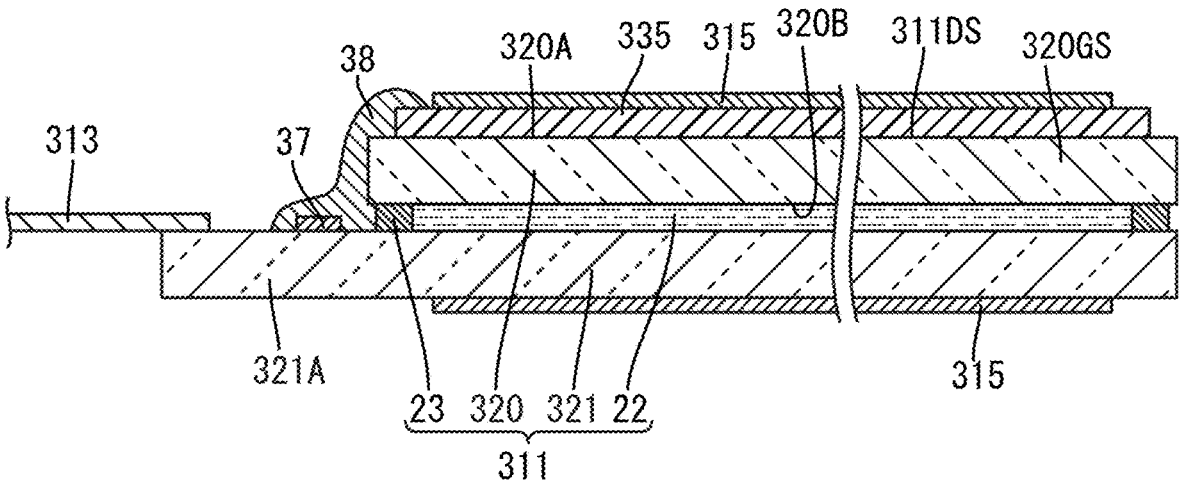
FIG. 16 is a cross-sectional view schematically illustrating a liquid crystal panel, a flexible substrate, and a conductive film according to a fourth embodiment.
Figure 16:
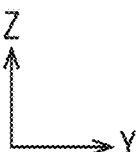

As illustrated in FIG. 16, the conductive film 335 of this embodiment is disposed on a first surface 320A (a display surface 311DS) of an opposed substrate 320. The conductive film 335 is disposed between the first surface 320A of the opposed substrate 320 and a front-side polarizing plate 315. The conductive film 335 is disposed to overlap an entire area of the display area AA of the display surface 311DS and an inner peripheral portion of the non-display area NAA. A connection electrode 37 that is charged at a ground potential is disposed on an unexposed section 321A of an array substrate 321. The connection electrode 37 is a portion of the metal film portions of which are configured as the gate lines 26 and the source lines 27. The connection electrode 37 is connected to the ground potential of the driver 12 or a flexible substrate 313. The connection electrode 37 is disposed closer to the opposed substrate 320 than to the flexible substrate 313 with respect to the Y-axis direction on the uncovered section 321A. A conductive paste portion 38 (a connection member) is disposed on the opposed substrate 320 and the uncovered section 321A of the array substrate 321 to extend from an edge portion of the opposed substrate 320 to the uncovered section 321A. The conductive paste portion 38 includes a portion (a first connection portion) that is disposed on the first surface 320A of the opposed substrate 320 and connected to the conductive film 335 and a portion (a second connection portion) that is disposed on the uncovered section 321A of the array substrate 321 and connected to the connection electrode 37. The conductive paste portion 38 is made of conductive paste including metal material such as silver paste and can be formed in various shapes. Therefore, the conductive paste portion 38 can be formed to extend longer than the thickness dimension of the opposed substrate 320 that is disposed between the conductive film 335 and the connection electrode 37. This ensures connection reliability between the conductive film 335 and the connection electrode 37.

Similar to the first embodiment, the conductive film 335 includes the insulating resin material 35A that contains electrically conductive agent (refer to FIGS. 7 and 8). The conductive film 335 includes olefin resin material or polyester resin material as the insulating resin material 35A. The refractive index of olefin resin material and polyester resin material is same as that of the first embodiment. The conductive film 335 includes the carbon nanotubes 35B or the transparent electrode material 35C as the electrically conductive agent. The carbon nanotubes 35B and the transparent electrode material 35C are same as those of the first embodiment.

Similar to the first embodiment, the conductive film 335 is configured such that the sheet resistance is from $1\times10^7$ $\Omega$/sq to $1\times10^9$ $\Omega$/sq and the refractive index is from 1.5 to 1.8 (more preferably from 1.5 to 1.7). With the sheet resistance of the conductive film 335 being $1\times10^7$ $\Omega$/sq or higher, the electric field created by the touch electrode 29 is less likely to be blocked by the conductive film 335 and the touch panel function can be effectively maintained. With the sheet resistance of the conductive film 335 being $1\times10^9$ Ω/sq or lower, the antistatic function of the conductive film 335 can be effectively exerted and display errors are less likely to be caused by the charge unevenness that remains on the screen for a long time. With the refractive index of the conductive film 335 being 1.8 or smaller, the difference in the refractive index between the glass substrate 320GS of the opposed substrate 320 and the conductive film 335 becomes sufficiently small and the amount of reflection light is effectively reduced. With the refractive index of the conductive film 335 being 1.5 or higher, a wide variety of materials of the insulating resin material 35A can be used for the conductive film 335.

As previously described, a liquid crystal panel 311 of this embodiment includes the opposed substrate 320 having the first surface 320A defined as the display surface 311DS, the array substrate 321 that is disposed opposite the second surface 320B of the opposed substrate 320 that is an opposite surface of the display surface 311DS, and the conductive film 335 that is disposed on one of the first surface 320A and the second surface 320B of the opposed substrate 320. The display surface 311DS of the opposed substrate 320 is divided into the display area AA displaying images and the non-display area NAA displaying no image. The opposed substrate 320 is made of glass material and the conductive film 335 is disposed to overlap at least the display area AA. The conductive film 335 has light transmissive properties and the sheet resistance is from $1\times10^7$ Ω/sq to $1\times10^9$ Ω/sq and the refractive index is from 1.5 to 1.8.

With the conductive film 335 being included in the opposed substrate 320, the opposed substrate 320 including the first surface 320A as the display surface 311DS is less likely to be statically charged. The refractive index of the opposed substrate 320 that is made of glass material is about 1.5 and the refractive index of the conductive film 335 is 1.8 or lower. The difference in the refractive index between the opposed substrate 320 and the conductive film 335 can be effectively reduced. Therefore, light is less likely to reflect off the interface between the conductive film 335 and the opposed substrate 320. Accordingly, display quality of images displayed on the display area AA that overlaps the conductive film 335 can be improved. Furthermore, the refractive index of the conductive film 335 is 1.5 or higher and therefore, a wide variety of materials can be used for the conductive film 335. With the sheet resistance of the conductive film 335 being $1\times10^7$ Ω/sq or higher, the electric field is less likely to be blocked by the conductive film 335. The function of the liquid crystal panel 311 is less likely to be lowered due to blocking of electric field. With the sheet resistance of the conductive film 335 is $1\times10^9$ Ω/sq or lower, the antistatic function of the conductive film 335 can be sufficiently exerted.

OTHER EMBODIMENTS

The technology described herein is not limited to the embodiments described above and illustrated by the drawings. For example, the following embodiments will be included in the technical scope of the present technology.

(1) The sheet resistance of the conductive films 35, 135, 235, 335 may be lower than $1\times10^7$ Ω/sq. The sheet resistance of the conductive films 35, 135, 235, 335 may be higher than $1\times10^9$ Ω/sq.

(2) The refractive index of the conductive films 35, 135, 235, 335 may be lower than 1.5. The refractive index of the conductive films 35, 135, 235, 335 may be higher than 1.8.

(3) Glass material having the refractive index other than 1.52 may be used as the glass material of the glass substrate 20GS, 320GS of the opposed substrate 20, 120, 320. In such a configuration, the refractive index of the conductive film 35, 135, 235, 335 may be other than the range of 1.5 to 1.8.

(4) In the configuration of each of the first to third embodiments, the conductive film 35, 135, 235 may be disposed in a layer upper than the layer including the light blocking portion 34 and lower than the layer including the color filters 33.

(5) In the configuration of each of the first to third embodiments, the number, the plan view arrangement, and the forming area (the plan view shape) of the connection portions 36, 136 in the liquid crystal panel 11 may be altered from those illustrated in the drawings.

(6) In the configuration of each of the first to third embodiments, the material of the base 36A of the connection portions 36, 136 may be different from the material of the sealing portion 23.

(7) In the configuration of each of the first, second, and the fourth embodiments, the specific material of the insulating resin material 35A included in the conductive film 35, 135, 335 may be altered as appropriate from those described above.

(8) In the configuration of each of the first, second, and fourth embodiments, the electrically conductive agent contained in the conductive film 35, 135, 335 may be altered as appropriate from those described above. Examples of the electrically conductive agent may be ZnO crystals, granulated carbon, and metal particles.

(9) In the configuration of the third embodiment, the specific materials of the conductive polymer material 235D included in the conductive film 235 may be altered as appropriate from those described above.

(10) In the configuration of the fourth embodiment, the conductive film 335 may be disposed on an entire area of the display surface 311DS and may be disposed to overlap an entire area of the display area AA and an entire area of the non-display area NAA.

(11) The configuration of the third embodiment (the conductive film 235 including the conductive polymer material 235D) may be applied to the configuration of the fourth embodiment.

(12) The opposed substrate 20, 120, 320 may include an overcoat film for planarization. The overcoat film may be included in a layer upper than the layer including the color filters 33. In each of the configurations of the first to third embodiments, the conductive film 35, 135, 235 may be disposed between the overcoat film and the color filters 33 or may be included in a layer upper than the layer including the overcoat film.

(13) The liquid crystal panel 11, 311 may be configured such that the array substrate 21, 321 is arranged on the front side and the opposed substrate 20, 120, 320 may be arranged on the back side (close to the backlight unit). In such a configuration, the array substrate 21, 321 that includes a display surface may include the conductive film 35, 135, 235, 335.

(14) The color filters 33 may be included in the array substrate 21, 321. The liquid crystal panel 11, 311 may have a color filter on array (COA) structure.

(15) The number of colors of the color filters 33 may be four or more. A yellow color filter that exhibits yellow or a transparent color filter through which light in all wavelength regions can pass may be additionally included.

(16) Between the pixel electrodes 25 and the common electrode 28, the common electrode 28 may be an upper electrode that is disposed in a layer above the layer including the pixel electrodes 25 and the pixel electrodes 25 may be lower electrodes that are disposed in a layer below the layer including the pixel electrodes 25. In such a configuration, the common electrode 28, which is the upper electrode, includes slits.

(17) The touch panel pattern may use a mutual-capacitance method other than the self-capacitance method.

(18) The liquid crystal panel 11, 311 may not include a touch panel pattern (a touch panel function). In such a configuration, the common electrode 28 is not divided into pieces and the touch electrodes 29 are not formed. The touch lines 30 are not formed.

(19) The display mode of the liquid crystal panel 11, 311 may not be the FFS mode but may be the VA mode and the IPS mode.

(20) The liquid crystal panel 11, 311 may be a reflective liquid crystal panel or a semitransmissive liquid crystal panel other than the transmissive liquid crystal panel. With the liquid crystal panel 11, 311 being a reflective liquid crystal type, the backlight unit may not be included.

(21) Display panels other than the liquid crystal panel 11, 311 (such as organic electro luminescence display panels) may be used.

The invention claimed is:

1. A display device, comprising:

a first substrate having a first surface defined as a display surface and a second surface that is an opposite surface of the first surface, the display surface being divided into a display area displaying an image and a non-display area displaying no image;

a second substrate disposed opposite the second surface of the first substrate;

a conductive film disposed on the second surface of the first substrate, the conductive film being disposed to overlap at least the display area and including a synthetic resin material having light transmissive properties;

a sealing portion having a frame shape and disposed between outer peripheral edge portions of the first substrate and the second substrate;

an electrode disposed on the second substrate and on an inner side of the sealing portion, the electrode being at a ground potential; and a connection portion disposed between the first substrate and the second substrate, on the inner side of the sealing portion, and connected to the conductive film and the electrode, wherein the conductive film is further disposed on the inner side of the sealing portion.

2. A display device comprising:

a first substrate having a first surface defined as a display surface and a second surface that is an opposite surface of the first surface, the display surface being divided into a display area displaying an image and a non-display area displaying no image;

a second substrate disposed opposite the second surface of the first substrate;

a conductive film disposed on the second surface of the first substrate, the conductive film being disposed to overlap at least the display area and including a synthetic resin material having light transmissive properties;

pixel electrodes;

a sealing portion having a frame shape and disposed between outer peripheral edge portions of the first substrate and the second substrate;

an electrode disposed on the second substrate and on an inner side of the sealing portion, the electrode being at a ground potential; and a connection portion disposed between the first substrate and the second substrate, and on the inner side of the sealing portion, and connected to the conductive film and the electrode, wherein the conductive film:

is further disposed on the inner side of the sealing portion, and is disposed in a solid manner to overlap an entirety of the display area, and to overlap the pixel electrodes.

* * * * *